United States Patent
Liu et al.

(10) Patent No.: US 10,841,203 B2
(45) Date of Patent: Nov. 17, 2020

(54) COORDINATION OF MULTIPLE ROUTES FOR A SINGLE IP CONNECTION

(71) Applicant: QUALCOMM Incorporated, San Diego, CA (US)

(72) Inventors: Feilu Liu, San Diego, CA (US); Aziz Gholmieh, Del Mar, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 15/373,315

(22) Filed: Dec. 8, 2016

(65) Prior Publication Data

US 2017/0171060 A1   Jun. 15, 2017

Related U.S. Application Data

(60) Provisional application No. 62/266,402, filed on Dec. 11, 2015.

(51) Int. Cl.
*H04L 12/761* (2013.01)
*H04L 29/06* (2006.01)
(Continued)

(52) U.S. Cl.
CPC ............ *H04L 45/16* (2013.01); *H04L 5/0007* (2013.01); *H04L 47/34* (2013.01); *H04L 67/32* (2013.01);
(Continued)

(58) Field of Classification Search
CPC ....... H04L 45/16; H04L 5/0007; H04L 47/34; H04L 67/32; H04L 69/04; H04L 69/16;
(Continued)

(56) References Cited

U.S. PATENT DOCUMENTS

| 7,248,586 B1 * | 7/2007 | Hughes, Jr. ........... H04L 49/508 370/394 |
| 8,214,509 B2 * | 7/2012 | Dabagh .................. H04L 69/12 709/228 |

(Continued)

FOREIGN PATENT DOCUMENTS

WO     2014182134 A1    11/2014

OTHER PUBLICATIONS

LG Electronics Inc. "HSUPA protocol issues", Prague, Czech Republic, Jun. 16, 2004-Jun. 20, 2004, 3GPP TSG-RAN WG2 Meeting #43. pp. 1-4.*

(Continued)

*Primary Examiner* — Un C Cho
*Assistant Examiner* — Shah M Rahman
(74) *Attorney, Agent, or Firm* — Arent Fox LLP

(57) ABSTRACT

An apparatus for receiving data over a communications link is provided. The apparatus includes a processing system configured to support a protocol stack comprising a first layer and a second layer. The processing system is configured to receive a plurality of data packets. Each of the data packets includes a first segment for processing at the first layer. Each of the first segments includes a first header and a first payload. Each of the first payloads includes a second segment having a second header and a second payload. The processing system is also configured to determine, at the first layer, whether to reorder the second segments for in-sequence delivery to the second layer based on information in one or more of the second headers or one or more configuration information from the processing system.

28 Claims, 15 Drawing Sheets

(51) Int. Cl.
| | |
|---|---|
| *H04L 29/08* | (2006.01) |
| *H04L 12/801* | (2013.01) |
| *H04L 5/00* | (2006.01) |
| *H04W 72/04* | (2009.01) |
| *H04W 28/02* | (2009.01) |
| *H04W 88/02* | (2009.01) |
| *H04W 88/08* | (2009.01) |

(52) U.S. Cl.
CPC ............. *H04L 69/04* (2013.01); *H04L 69/16* (2013.01); *H04L 69/22* (2013.01); *H04L 69/28* (2013.01); *H04L 69/321* (2013.01); *H04W 72/0406* (2013.01); *H04W 28/0268* (2013.01); *H04W 88/02* (2013.01); *H04W 88/08* (2013.01)

(58) Field of Classification Search
CPC ....... H04L 69/22; H04L 69/28; H04L 69/321; H04L 47/35; H04W 72/0406; H04W 88/02; H04W 88/08; H04W 28/0268
See application file for complete search history.

(56) References Cited

U.S. PATENT DOCUMENTS

| | | | | |
|---|---|---|---|---|
| 8,891,356 B2* | 11/2014 | Zhang | ................... | H04L 1/1874 370/216 |
| 9,306,708 B2 | 4/2016 | Lu et al. | | |
| 9,385,931 B1* | 7/2016 | Vivanco | .............. | H04L 43/0847 |
| 9,485,794 B2 | 11/2016 | Edge et al. | | |
| 2002/0196760 A1* | 12/2002 | Malomsoky | ............ | H04L 47/10 370/338 |
| 2005/0147040 A1* | 7/2005 | Vayanos | ............ | H03M 13/2707 370/235 |
| 2007/0070916 A1* | 3/2007 | Lehane | .................... | H04L 43/18 370/252 |
| 2008/0076359 A1* | 3/2008 | Charpentier | ........ | H04L 12/1868 455/63.1 |
| 2008/0310367 A1* | 12/2008 | Meylan | ................. | H04W 36/02 370/331 |
| 2009/0034507 A1* | 2/2009 | Chang | ............... | H04W 12/0013 370/349 |
| 2009/0103478 A1* | 4/2009 | Sammour | ............. | H04L 1/1874 370/328 |
| 2009/0116490 A1* | 5/2009 | Charpentier | .......... | H04L 1/1841 370/395.1 |
| 2009/0149189 A1* | 6/2009 | Sammour | ............... | H04L 1/165 455/450 |
| 2010/0195519 A1* | 8/2010 | Ji | ........................... | H04L 1/187 370/252 |
| 2010/0274915 A1* | 10/2010 | Ho | .......................... | H04L 45/00 709/230 |
| 2012/0294281 A1* | 11/2012 | Park | ...................... | H04L 1/1841 370/331 |
| 2014/0056307 A1* | 2/2014 | Hutchison | ............. | H04L 49/552 370/394 |
| 2014/0269774 A1* | 9/2014 | Callard | .................... | H04L 69/04 370/477 |
| 2014/0362699 A1* | 12/2014 | Kanamarlapudi | ...... | H04L 47/34 370/235 |
| 2015/0029863 A1* | 1/2015 | Lai | .................... | H04W 28/0284 370/237 |
| 2015/0172984 A1* | 6/2015 | Racz | ................... | H04W 56/001 370/331 |
| 2015/0215987 A1* | 7/2015 | Kim | ...................... | H04L 1/1848 370/329 |
| 2016/0021018 A1* | 1/2016 | Hui | ....................... | H04L 47/624 370/412 |
| 2016/0087776 A1* | 3/2016 | Chun | ...................... | H04W 4/06 370/312 |
| 2016/0094446 A1* | 3/2016 | Kazmi | ................ | H04L 12/6418 370/392 |
| 2016/0113058 A1* | 4/2016 | Jung | .................... | H04B 7/2612 370/328 |
| 2016/0156548 A1* | 6/2016 | Pazhyannur | .......... | H04W 28/08 370/338 |
| 2016/0182369 A1* | 6/2016 | Vasudevan | ............... | H04L 45/74 370/235 |
| 2016/0219024 A1* | 7/2016 | Verzun | .................. | H04L 9/0662 |
| 2016/0234127 A1* | 8/2016 | Agarwal | ............. | H04L 67/2852 |
| 2016/0285746 A1* | 9/2016 | Parron | .................. | H04L 45/245 |
| 2016/0315868 A1* | 10/2016 | Zhang | ................ | H04L 47/34 |
| 2016/0337254 A1* | 11/2016 | Karaki | .................. | H04L 47/283 |
| 2017/0264562 A1* | 9/2017 | Yi | .......................... | H04W 80/02 |
| 2018/0152353 A1* | 5/2018 | Bergstrom | ............ | H04W 40/12 |

OTHER PUBLICATIONS

Philips. "Usage of RLC SN in MAC", Berlin, Jul. 9, 2001-Jul. 13, 2001.TSG-RAN Working Group 2 (Radio layer 2 and Radio layer 3). pp. 1, 2.*
Siemens. "E-DCH—Re-ordering", Sophia Antipolis, France, Oct. 4, 2004-Oct. 8, 2004. 3GPP TSG-RAN WG2 Meeting #44. pp. 1-4.*
Stevens, W. Richard, "TCP/IP Illustrated, vol. 1 The Protocols", 1994, Addison-Wesley, pp. 242-247 (Year: 1994).*
International Search Report and Written Opinion—PCT/US2016/065878—ISA/EPO—dated Apr. 11, 2017.
LG Electronics Inc., "HSUPA Protocol Issues," 3GPP Draft, 3GPP TSG RAN WG2, Meeting #43, R2-041545, Jul. 31, 2006, pp. 1-4, XP050126251. [ retrieved on Jul. 31, 2006 ].
Philips., "Usage of RLC SN in MAC," 3GPP Draft, TSG-RAN Working Group 2 ( Radio layer 2 and Radio Layer 3 ), R2-011729, Jul. 9-13, 2001, pp. 1-3, XP050118491. [ retrieved on Jul. 14, 2001 ].
Siemens., "E-DCH—Re-ordering," 3GPP Draft, 3GPP TSG-RAN WG2, Meeting #44, R2-042122, Sep. 30, 2004, pp. 1-4, XP050126739. [ retrieved on Sep. 30, 2004 ].
"3rd Generation Partnership Project; Technical Specification Group Radio Access Network; Radio Interface Protocol Architecture (Release 12)", 3GPP Standard; 3GPP TS 25.301, 3rd Generation Partnership Project (3GPP), Mobile Competence Centre; 650, Route es Lucioles; F-06921 Sophia-Antipolis Cedex; France, vol. RAN WG2, No. V12.0.0, Sep. 23, 2014 (Sep. 23, 2014), XP050925649, pp. 1-56.
Second Written Opinion from International Application No. PCT/US2016/065878, dated Nov. 14, 2017, 10 pages.

* cited by examiner

COORDINATION OF MULTIPLE ROUTES FOR A SINGLE IP CONNECTION

CROSS-REFERENCE TO RELATED APPLICATION(S)

This application claims the benefit of U.S. Provisional Application Ser. No. 62/266,402, entitled "Coordination of Multiple Routes for a Single IP Connection" and filed on Dec. 11, 2015, which is expressly incorporated by reference herein in its entirety.

BACKGROUND

Field

The present disclosure relates generally to communication systems, and more particularly, to end-to-end transmission of data between wireless devices.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, the improvements should be applicable to other multi-access technologies and the telecommunication standards that employ these technologies.

For example, LTE may employ a radio protocol architecture for the user and control planes. The protocol architecture (e.g., "protocol stack") may separate signaling functions between layers, including functions such as scheduling and error processing. However, redundant scheduling and error processing protocols over a succession of layers may cause delay in end-to-end transmissions, as each layer may independently detect and attempt to correct errors in the transmission of a packet stream. In some instances, this delay may be intensified through the use of multiple transmission paths for end-to-end transmissions, as each layer may detect a non-sequential reception of a data sequence as an error. A solution is needed to address some of the delay issues related to the radio protocol architecture.

SUMMARY

In an aspect of the disclosure apparatuses and computer program products for receiving data over a communications link are provided. The apparatus includes a processing system configured to support a protocol stack comprising a first layer and a second layer. The processing system may receive a plurality of data packets. Each of the data packets may include a first segment for processing at the first layer. Each of the first segments may include a first header and a first payload. Each of the first payloads may include a second segment having a second header and a second payload.

In an aspect, the processing system may also determine, at the first layer, whether to reorder the second segments for in-sequence delivery to the second layer based on at least one of information in one or more of the second headers or one or more configuration information from the processing system. In an aspect, the processing system may deliver the second segments to the second layer and may determine, at the second layer, whether the second segments were reordered at the first layer for in-sequence delivery to the second layer based on information in one or more of the second headers or based on one or more configuration information from the processing system or based on one or more configuration information from the first layer. In an aspect, the processing system may determine whether to reorder the second segments at the first layer for in-sequence delivery to the second layer based on whether the data packets are related to a common flow.

In an aspect, an apparatus includes a processing system configured to support a protocol stack comprising a first layer and a second layer. The processing system may establish a flow with a node. The establishment may include receiving configuration information, wherein the flow is associated with a plurality of data packets. Each of the data packets may include a first segment for processing at the first layer. Each of the first segments may include a first header and a first payload. Each of the first payloads may include a second segment having a second header and a second payload. In an aspect, the processing system may determine whether to reorder the second segments at the first layer for in-sequence delivery to the second layer based on the configuration information.

In an aspect, an apparatus includes a processing system configured to establish a flow with a node supporting a protocol stack having a first layer and a second layer. The flow may be associated with a plurality of data packets. Each of the data packets may include a first segment for processing at the first layer. Each of the first segments may include a first header and a first payload. Each of the first payloads may include a second segment having a second header and a second payload. In an aspect, the establishment of the flow may include transmitting configuration information or capability information to the node indicating whether to reorder the second segments at the first layer for in-sequence delivery to the second layer.

Other aspects of apparatuses, methods, systems, and computer program products are also provided in this description. It is understood that other aspects will become readily apparent to those skilled in the art from the following detailed description, wherein various aspects of apparatuses, methods, systems, and computer program products are shown and described by way of illustration. As will be realized, these aspects may be implemented in other and different forms and its several details are capable of modification in various other respects. Accordingly, the drawings and detailed description are to be regarded as illustrative in nature and not restrictive.

DETAILED DESCRIPTION

Figure 1:
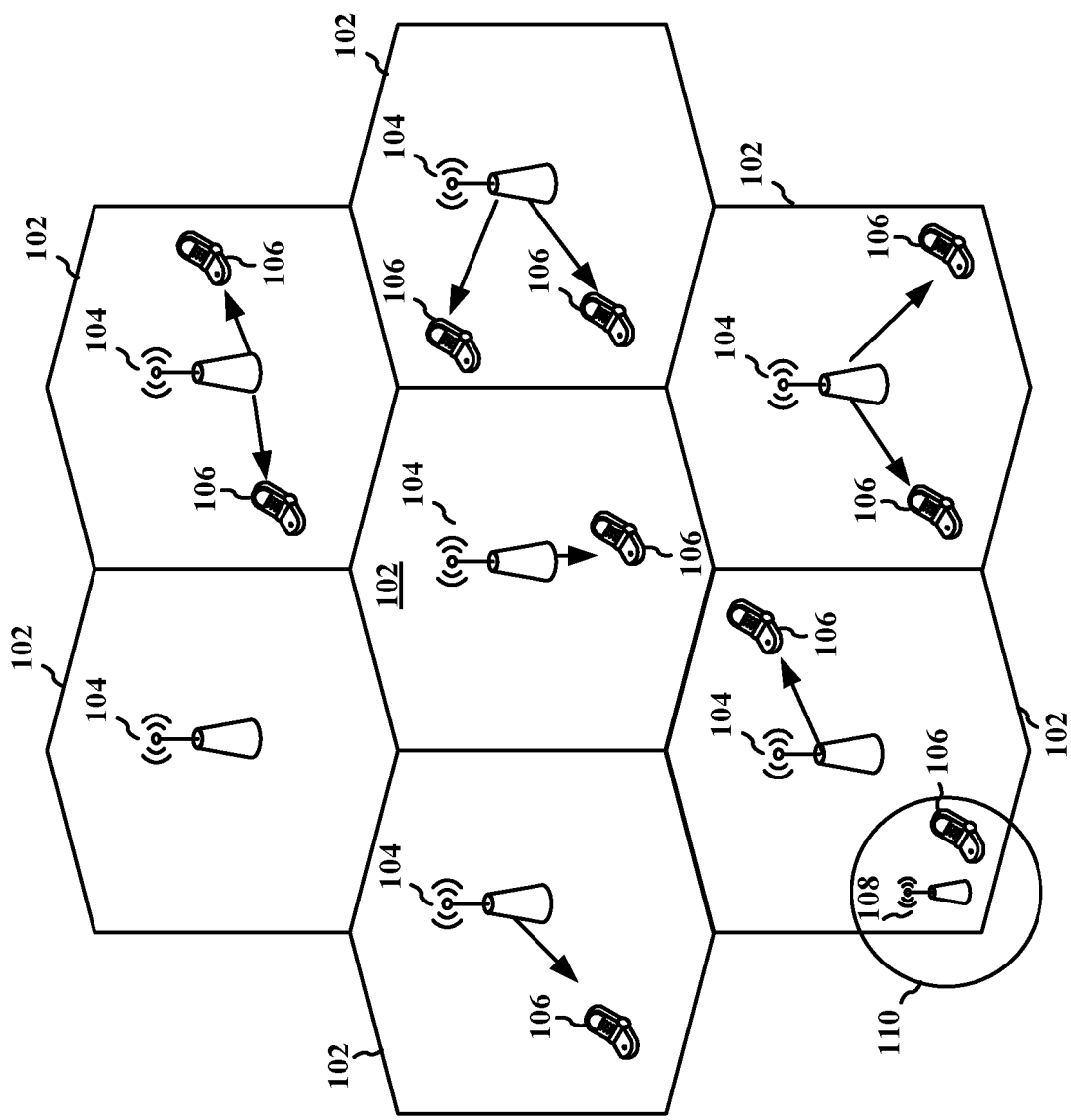
FIG. 1 is a diagram illustrating an example of an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. The apparatus and methods will be described in the following detailed description and illustrated in the accompanying drawings by various blocks, modules, components, circuits, steps, processes, algorithms, etc. (collectively referred to as "elements"). The elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), RISC processors, systems on a chip (SoC), baseband processors, field-programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer-executable code in the form of instructions or data structures that can be accessed by a computer.

FIG. 1 is a diagram illustrating an example of an access network 100 in a wireless network, such as an LTE network architecture. In this example, the access network 100 is divided into a number of cellular regions (cells) 102. One or more lower power class base stations, such as eNodeBs ("eNBs") 108 may have cellular regions 110 that overlap with one or more of the cells 102. The lower-power class eNB 108 may be a femto cell (e.g., home eNB (HeNB)), pico cell, micro cell, or remote radio head (RRH). The macro eNBs 104 are each assigned to a respective cell 102 and are configured to provide an access point to the network for all the user equipment (UE) 106 in the cells 102. There is no centralized controller in this example of an access network 100, but a centralized controller may be used in alternative configurations.

UEs 106 may be wireless devices that may send and/or receive data packets through the access network. In an LTE network architecture, eNBs 108 may provide an access point to the packet core (e.g., evolved packet core or "EPC") for UEs 106. Examples of UEs 106 include a cellular phone, a smart phone, a tablet computer, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 106 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNBs 104 may provide user and control plane protocol terminations and may be responsible for all radio-related functions, including radio bearer control, admission control, mobility control, scheduling, security, and connectivity to a serving gateway. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein. The eNB 104 may also be referred to as a base station, a Node B, an access point, a base transceiver station, a radio base station, a radio transceiver, a transceiver function, a basic service set (BSS), an extended service set (ESS), or some other suitable terminology.

The modulation and multiple access scheme employed by the access network 100 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well-suited for LTE applications. However, these concepts may be readily extended to other telecommunication standards employing other modulation and multiple access techniques. By way of example, the concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 104 may have multiple antennas supporting MIMO technology. The use of MIMO technology enables the eNBs 104 to exploit the spatial domain to support spatial multiplexing, beamforming, and transmit diversity. Spatial multiplexing may be used to transmit different streams of data simultaneously on the same frequency. The data streams may be transmitted to a single UE 106 to increase the data rate or to multiple UEs 106 to increase the overall system capacity. This is achieved by spatially precoding each data stream (i.e., applying a scaling of an amplitude and a phase) and then transmitting each spatially precoded stream through multiple transmit antennas on the DL. The spatially-precoded data streams arrive at the UE(s) 106 with different spatial signatures, which enables each of the UE(s) 106 to recover the one or more data streams destined for that UE 106. On the UL, each UE 106 transmits a spatially precoded data stream, which enables the eNB 104 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 2:
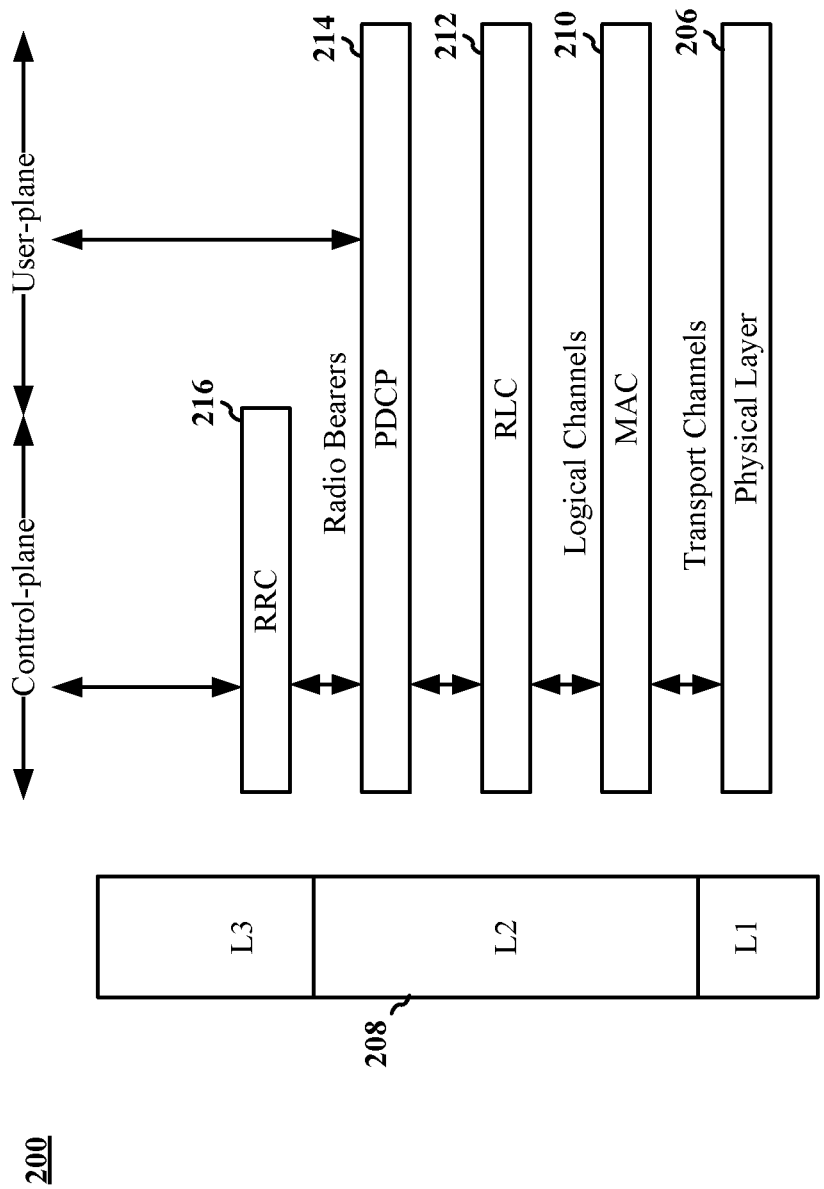
FIG. 2 is a diagram illustrating an example of a radio protocol architecture for the user and control planes.

FIG. 2 is a diagram illustrating an example of a radio protocol architecture 200 for the user and control planes in LTE. The radio protocol architecture 200 (e.g., "protocol stack") for UE 106 and eNB 104 is shown with multiple layers: Layer 1, Layer 2, and Layer 3. Layer 1 (L1 layer) is the lowest layer and implements various physical-layer signal-processing functions. The L1 layer will be referred to herein as the physical layer 206. Layer 2 (L2 layer) 208 is above the physical layer 206 and is responsible for the link between the UE 106 and eNB 104 over the physical layer 206.

In the user plane, the L2 layer 208 includes a media access control (MAC) sublayer 210, a radio link control (RLC) sublayer 212, and a packet data convergence protocol (PDCP) 214 sublayer, which are terminated at the eNB on the network side. In an aspect, the UE 106 may have several upper layers above the L2 layer 208 including a network layer (e.g., IP layer) that is terminated at a packet data network (PDN) gateway on the network side. In an aspect, the UE 106 may also have higher layers, such as a Layer 4 (L4 layer) like a transmission control protocol (TCP) layer, and/or a Layer 5 or a Layer 7 like an application layer that is terminated at the other end of the connection (e.g., far-end UE, server, etc.).

The PDCP sublayer 214 provides multiplexing between different radio bearers and logical channels. The PDCP sublayer 214 also provides header compression for upper-layer data packets to reduce radio transmission overhead, security by ciphering the data packets, and handover support for UEs between eNBs. The RLC sublayer 212 provides segmentation and reassembly of upper-layer data packets, retransmission of lost data packets, and reordering of data packets to compensate for out-of-order reception using hybrid automatic repeat request (HARQ). The MAC sublayer 210 provides multiplexing between logical and transport channels. The MAC sublayer 210 is also responsible for allocating the various radio resources (e.g., resource blocks) in one cell among the UEs. The MAC sublayer 210 is also responsible for HARQ operations.

In an aspect, as will be discussed in further detail below, one or more of the L2 and/or high layers (e.g., L4, L7, etc.) may provide reordering of data packets to compensate for out-of-order reception of data packets. In an aspect, the data packets may be received out-of-order due to use of multiple communication links such that data transmission is disbursed throughout multiple links. In an aspect, lower-level layers (e.g., L2 layers) may be configured to abstain from reordering such that the reordering of the data packets is conducted only at higher layers. In an aspect, the high layers may flag or trigger the lower layers into abstaining from reordering.

In the control plane, the radio protocol architecture 200 for the UE and eNB is substantially the same for the physical layer 206 and the L2 layer 208, with the exception that there is no header compression function for the control plane. The control plane also includes a radio resource control (RRC) sublayer 216 in Layer 3 (L3 layer). The RRC sublayer 216 is responsible for obtaining radio resources (e.g., radio bearers) and for configuring the lower layers using RRC signaling between the eNB 104 and the UE 106.

Figure 3:
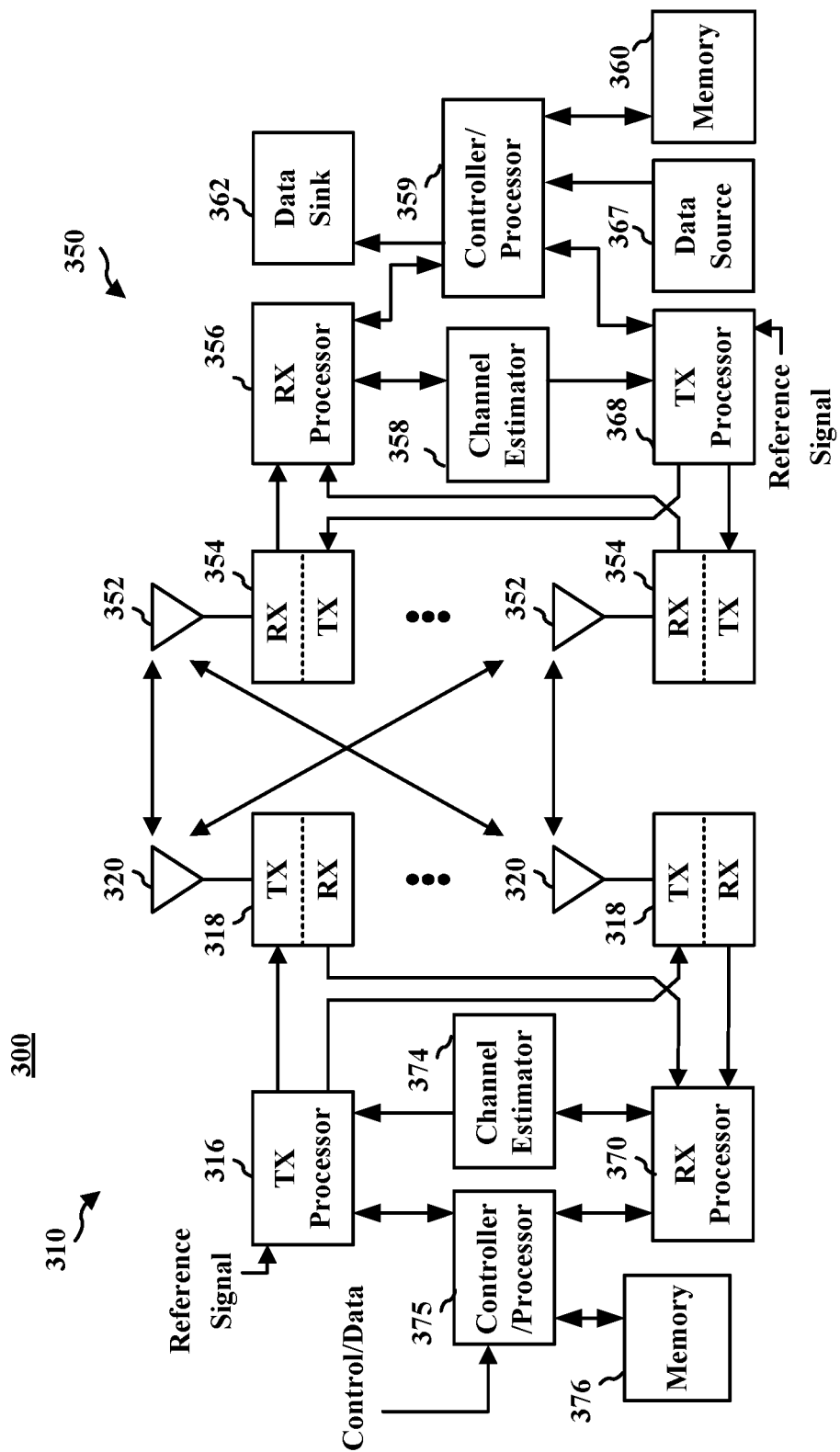
FIG. 3 is a diagram illustrating an example of an evolved Node B and user equipment in an access network.

FIG. 3 is a block diagram of an eNB 310 in communication with a UE 350 in an access network. In the DL, upper-layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions include coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal-processing functions of the L1 layer. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. The soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper-layer packets from the core network. The upper-layer packets are then provided to a data sink 362, which represents all the protocol layers above the L2 layer, including, for example, the L4 and L7 layers. Various control signals may also be provided to the data sink 362 for L3/L4/L7, etc. processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides de-multiplexing between transport and logical channels, packet reassembly, deciphering, header decompression, control signal processing to recover upper-layer packets from the UE 350. Upper-layer packets from the controller/processor 375 may be provided to the core network. The controller/processor 375 is also responsible for error detection using an ACK and/or NACK protocol to support HARQ operations.

Figure 4:
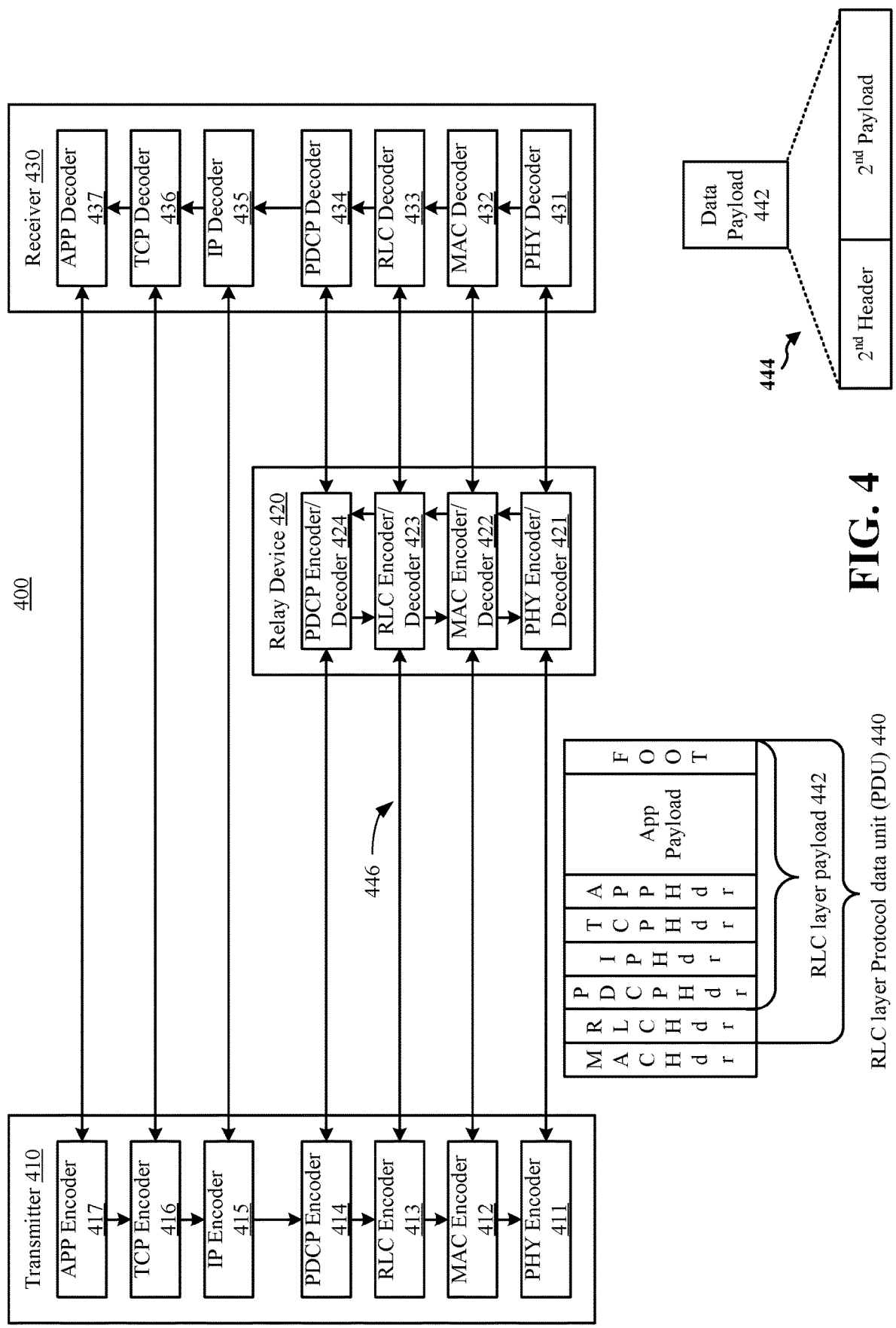
FIG. 4 is a diagram illustrating an example of end-to-end connections between devices in wireless communication network.

FIG. 4 is a diagram illustrating an example of end-to-end connections between devices in wireless communication network. Network 400 includes a transmitter 410, a relay device 420 (e.g., an access network node, for example, an eNB in LTE), and a receiver 430, with a RLC layer Protocol data unit (PDU) 440 being transmitted from transmitter 410 to receiver 430 via relay device 420, e.g., using a connection 446.

Transmitter 410 can be a wireless device, such as a UE similar to UE 106, 350 that may send a RLC layer payload 442 to receiver 430. Transmitter 410 may have one or more application (APP) layer encoders 417, a TCP encoder 416, an IP encoder 415, L2 layer encoders including a PDCP encoder 414, RLC encoder 413, and MAC encoder 412, and a L1 physical (PHY) layer encoder 411. In an aspect, for example, transmitter 410 can use encoders 411-417 in succession from APP layer encoder 417 to PHY encoder 411 to encapsulate a RLC layer payload 442 with a series of headers. For example, in an aspect, transmitter 410 may encapsulate a RLC layer payload 442 to generate a RLC layer Protocol data unit (PDU) 440, which is sent to receiver 430 via one or more relay devices 420 (e.g., an access network node, for example, an eNB in LTE). In an aspect, RLC layer Protocol data unit (PDU) 440 may include header information with relay device 420 as the initial target recipient, which may then decapsulate and re-encapsulate the RLC layer Protocol data unit (PDU) 440 with new header information such that receiver 430 becomes the new target recipient.

The APP layer encoder 417 may receive a RLC layer payload 442 and encapsulate the RLC layer payload 442 with an application header to produce an application-layer message. In an aspect, application-layer message may also be known as an upper-layer (UPL) message. The application layer provides network applications with functions to execute necessary functions of the network application. In an aspect, the application layer provides services to initiate the transfer of a RLC layer payload 442 for transmission over the network. In an aspect, the APP layer encoder 417 can include configuration instructions in the application-layer header or payload that the application-layer decoder 437 is configured to perform the re-ordering of any data packets received out-of-sequence. In an aspect, the configuration instructions may be, for example a non-volatile (NV) item.

TCP encoder 416 may receive the application-layer message from the APP layer encoder 417 and may add a TCP header to the application-layer message to generate a TCP message. The TCP layer is a transport layer that provides transport layer services between end points. In an aspect, the TCP layer 218 may be provide flow control and/or congestion control to higher layers. In an aspect, the TCP layer 218 may segment a message from a higher layer, such as the application-layer messages received from the APP layer encoder 417, and split the message into smaller units to generate a message sequence. In an aspect, TCP encoder 416 can include configuration instructions in the TCP header or payload that the TCP decoder 436 is configured to perform the re-ordering of any data packets received out-of-sequence. Alternatively, the configuration instructions in the TCP header or payload can include instructions or an indication that the UE is not to reorder data packets that were received out-of-sequence. In an aspect, the configuration instructions may be, for example a non-volatile (NV) item.

In an aspect, as will be discussed in further detail below, the APP layer encoder 417 and/or TCP encoder 416 may include a multi-link flag in the APP header or TCP header that indicates that the transport blocks 440 that encapsulate the one or more application-layer messages and/or TCP messages are using multiple logical connections and physical channels to transmit messages to receiver 430. In an aspect, the APP layer encoder 417 and/or TCP encoder 416 may include configuration information in the APP header, TCP header, and/or RLC layer payload 442 to indicate that the transport blocks 440 that encapsulate the one or more application-layer messages and/or TCP messages are using multiple logical connections and physical channels to transmit messages to receiver 430.

In an aspect, portions of a relay device 420 (e.g., an access network node, for example, an eNB in LTE) and/or a receiver 430, such as the L2 decoders (MAC/RLC/PDCP decoders 422-424, 432-434) may refrain from reordering out-of-order layer 2 frames and deliver the resultant payload (IP datagram, TCP message, or application-layer message) to a higher-layer decoder, which may reorder the data packets based on the information included in the headers.

In an aspect, the portions of the relay device 420 and/or receiver 430 may determine whether data packets received out-of-sequence were received over multiple connections and whether the data packets received out-of-sequence over multiple connections are related to a common data flow. For example, each data packet in a common data flow may include a common bearer ID in each of their respective RLC headers. In an aspect, the bearer ID may be included in the PDCP headers. In such instances, the L2 decoders 422-424, 432-434 may refrain from reordering out-of-order L2 frames and may deliver the resultant payload to a higher-layer decoder. In an aspect, relay device 420 may re-encapsulate the out-of-sequence data packets with header information for another relay device 420 or receiver 430 without reordering the data packets.

IP encoder 415 may receive the TCP message generated from TCP encoder 416 and may add an IP header to the TCP message to generate an IP datagram. The IP layer is a network layer that ensures end-to-end delivery of packets from transmitter 410 to receiver 430. The IP layer can control the physical path each data packet takes to the endpoint and may translate logical addresses to physical addresses. In an aspect, the IP encoder may fragment a TCP message into multiple IP datagrams. In an aspect, IP encoder 415 may include a multi-link flag or other indicator flag that may specify which layers of a receiver are to reorder data packets that are not received in sequence.

L2 encoders, including PDCP encoder 414, RLC encoder 413, and MAC encoder 412, may receive an IP datagram from IP encoder 415 and may successively add respective PDCP, RLC, and MAC headers and an L2 footer to the IP datagram to generate a Layer 2 (L2) frame. As discussed above in relation to L2 layer 208, allows the transport block to be sent on a specified link to a relay device 420 (e.g., an access network node, for example, an eNB in LTE) via a physical channel. In an aspect, the transport block may include headers that specify the relay device 420 as the initial recipient, with the relay device 420 decapsulating and re-encapsulating the RLC layer Protocol data unit (PDU) 440 with new headers that specifies a new target. In an aspect, the new target may be one or more intermediate relay devices 420. In an aspect, the new target may be the endpoint target of receiver 430. In an aspect, each of the L2 headers may include information regarding the data packet and/or data flow. For example, the RLC header may include a bearer ID that indicates whether a plurality of data packets share a common data flow (e.g., each data packet in a common data flow will share the same bearer ID value). Similarly, the PDCP header may include the sequence numbers of data packets such that a decoder may determine whether the data packets were received in sequence.

Physical-layer (PHY) encoder 411 may receive the L2 frame from one of the L2 encoders 412-414 and may modulate the frame so that is transmitted through the physical channel. As discussed above in relation to the UE/eNB diagram 300 of FIG. 3, the PHY encoder 411 may be similar to TX processor 316 and may facilitate the transmission of the L2 frame over the physical channel to relay device 420.

Relay device 420 (e.g., an access network node, for example, an eNB in LTE) may be a base station, such as eNB 104, 310, or may be another UE, such as UE 106, 350. Relay device may include decoders to decapsulate the L1 and L2 headers to recover a payload in the form of an IP datagram from the received RLC layer Protocol data unit (PDU) 440. In an aspect, relay device 420 may also include encoders to generate transport blocks for the recovered payloads with new L2 and PHY header information. In an aspect, the new header information may include information for the next target recipient in the communication link for the IP datagram. For example, in an aspect the next target recipient may be another relay device 420; in other instances, the next target recipient may be the endpoint receiver 430 as the next target recipient. In an aspect, relay device 420 may include combination encoder/decoders 421-424 that act in a manner similar to encoders 411-414 and decoders 431-434 to decapsulate and re-encapsulate transport blocks and forward them to the next point in a communication link.

Receiver 430 may be a device, such as a UE similar to UEs 106, 350 that may receive a RLC layer payload 442 from transmitter 410. Receiver 430 may include one or more decoders 431-437 that match encoders 411-417 of transmitter 410, with each decoder decapsulating and processing a header generated by its counterpart encoder. For example, PDCP decoder 434 of receiver 430 may receive a L2 frame from RLC decoder 433 that has had the MAC and RLC headers removed by MAC decoder 432 and RLC decoder 433, respectively, and may decapsulate and process the PDCP header from the L2 frame and provide the resultant payload (IP datagram, TCP message, or application-layer message) to IP decoder for further processing. In an aspect, one or more of decoders 431-437 may determine which of the decoders 431-437 will re-order received data packets determined not to be in sequence. In an aspect, this determination may occur as part of the establishment of a bearer associated with the reception of the packets. In an aspect, the configuration of one or more decoders 431-437 being configured to reorder out-of-sequence data packets may be included in configuration information provided by one or more of decoders 431-437. In an aspect, one or more of encoders 411-417 may provide configuration instructions to receiver 430 via RLC layer Protocol data unit (PDU) 440.

In an aspect, each of the L2 layer decoders (MAC decoder 432, RLC decoder 433, and/or PDCP decoder 434 may include a scheduler to re-sequence data packets received out of order. In an aspect, one or more of L2 layer decoders 432-434 may inspect the contents of each of RLC layer Protocol data unit (PDU) 440 to determine whether the packets are out-of-sequence. In an aspect, for example, one or more of L2 layer decoders 432-434 may inspect the respective headers for sequence numbers to determine whether the numbers are out-of-sequence. In an aspect, one or more of L2 layer decoders 432-434 may use further information to determine whether the decoders 432-434 should reorder the data packets determined not to be in sequence. In one aspect, for example, L2 layer decoders 431-434 may inspect the payload for configuration instructions or a multi-link flag that specifies whether that respective layer is to re-order non-sequential packets. In another aspect, L2 layer decoders 432-434 may determine the number of links used to receive the packets and whether the packets received over multiple links are related to a common data flow; in such instances, L2 layer decoders 432-434 may refrain from reordering the received data packets. In another aspect, L2 layer decoders 432-434 may receive configuration information regarding higher-layer decoders 435-437. In an aspect, L2 layer decoders may receive the configuration information from within receiver 430 (e.g., from higher-layer decoders 435-437).

In an aspect, for example, as will be discussed in further detail in relation to FIG. 5, transmitter 410 may use multiple links to send a message sequence, with each of the links having differing transmission path speeds. As will be discussed in relation to FIGS. 6A-6D, each of the L2 layer decoders 422-424 of relay device 420 and L2 decoders 432-434 of receiver 430 may use their respective scheduler to determine whether data packets were received out-of-order, which links were used to receive the data packets, and use information included in the respective headers to process the data packets and/or reorder the data packets such that they are in sequence. In an aspect, one or more of L2 decoders 422-434 may process the payload of the L2 frame (such as processing the TCP header, APP header, and/or data payload) to determine whether the payload includes an active multi-link flag or configuration information that indicates that sequence of payloads was sent are using multiple logical connections and physical channels. In such instances, the L2 decoders 421-424, 432-434 may refrain from reordering the received Protocol data units (PDU) and may send the resultant payload to a higher-layer decoder 435-437 without reordering the sequence of packets. In an aspect, the multi-link flag may specify which, if any, of L2 layer decoders 422-424, 432-434 are to reorder data packets determined to be non-sequential.

PHY decoder 431 may be similar to RX processor 370 demodulate the received RLC layer Protocol data unit (PDU) 440 and send the resultant L2 frame to MAC decoder 432. In an aspect, PHY decoder 431 may check for errors and may send HARQ messages back to transmitter 410 if the RLC layer Protocol data unit (PDU) 440 was received in error.

MAC decoder 432 may receive the L2 frame and may process the MAC header from the L2 frame. In an aspect, MAC decoder 432 may determine that a sequence of L2 frames were received out-of-order and may respond by sending a retransmission request in the form of a HARQ message to transmitter 410 (via relay device 420). In an aspect, MAC decoder 432 may refrain from transmitting the retransmission request upon processing configuration information or a multi-link flag included in the L2 frame. In an aspect, MAC decoder may also receive a multi-link flag from a higher-level decoder, such as TCP decoder 436 or APP decoder 437 that indicates that MAC decoder should refrain from reordering the out-of-order data packets. RLC decoder 433 may receive the L2 frame from MAC decoder 432 and may decapsulate and process the RLC header included in the L2 frame. RLC decoder 433 may similarly attempt to reorder out-of-order L2 frames using the information included in the RLC headers and may also send retransmission requests to transmitter 410. PDCP decoder 434 may receive L2 frame from RLC decoder 433 and may decapsulate and process the PDCP header and may provide the resulting IP datagram to IP decoder 435. PDCP decoder 434 may similarly attempt to reorder out-of-order L2 frames using the information included in the PDCP headers.

IP decoder 435 may decapsulate and may process the IP header included in the IP datagram provided by PDCP decoder 434 to provide a TCP message to TCP decoder 436. In an aspect, IP decoder 435 may send the resultant TCP message to TCP decoder 436 without attempting to reorder the sequence of IP datagrams.

TCP decoder 436 may receive a TCP message from IP decoder 435. In an aspect, TCP decoder 436 may determine whether TCP messages were received in error and/or reorder a sequence of received data packets to compensate for out-of-order reception using acknowledgement (ACK) signals. In an aspect, a receiver of the message sequence may reassemble the message by extracting the RLC layer payload 442 from an in-order message sequence. In an aspect, for example, TCP decoder 436 may generate an ACK message upon successful receipt of a TCP message. In an aspect, the ACK message may indicate the expected next packet in the sequence.

When TCP decoder 436 receives a TCP message out-of-order, the transmitter may then receive multiple, duplicate ACK message indicating the same anticipated next TCP message. In an aspect, the TCP decoder 436 may start a reordering timer and wait to transmit ACK until the TCP decoder 436 receives subsequent TCP messages; as more TCP messages arrive, TCP decoder 436 may generate more ACK messages. In an aspect, TCP decoder 436 may also reorder the TCP messages such that they are in sequence. In instances where TCP decoder 436 receives the requested next TCP message, TCP decoder may then reorder the packets before the reordering timer expires. In instances where the reordering timer expires, TCP decoder 436 may send all the generated ACK messages to the transmitter 410. In an aspect, TCP decoder 436 may also generate duplicate ACK messages once the reordering timer expires.

In an aspect, TCP decoder 436 may also include a multi-link flag that is similar to the multi-link flag included in the contents of RLC layer Protocol data unit (PDU) 440. In an aspect, TCP decoder 436 may, for example, send the multi-link flag to one or more lower-layer decoders like L2 decoders 432-434 such that the one or more of the L2 decoders 432-434 refrain from reordering data packets that are determined to be out-of-order. In an aspect, one or more of the L2 decoders 432-434 may refrain from reordering while a third L2 decoder 432-434 reorders the data sequence. For example, multi-link flag may indicate that RLC decoder 433 and MAC decoder 432 refrain from reordering while indicating that PDCP decoder 434 should reorder and detected out-of-order L2 frames based on the contents of the PDCP headers included in the L2 frames.

Application decoder 437 may receive an upper-layer message from TCP decoder 436 and may retrieve the RLC layer payload 442. In an aspect, application decoder 437 may perform the reordering of out-of-order messages; this may occur, for example, when the messages contain data for multimedia content (e.g., voice and video calls). In an aspect, application decoder 437 may include a reordering timer that acts in a similar manner to the reordering timer used by TCP decoder 436. In another aspect, application decoder 437 may receive timing information from lower layer decoders, such as L2 decoders 432-434.

In an aspect, RLC layer Protocol data unit (PDU) 440 may include a first header and a RLC layer payload 442. The RLC layer payload 442 may include a second segment (444) having a second header and a second payload.

Figure 5:
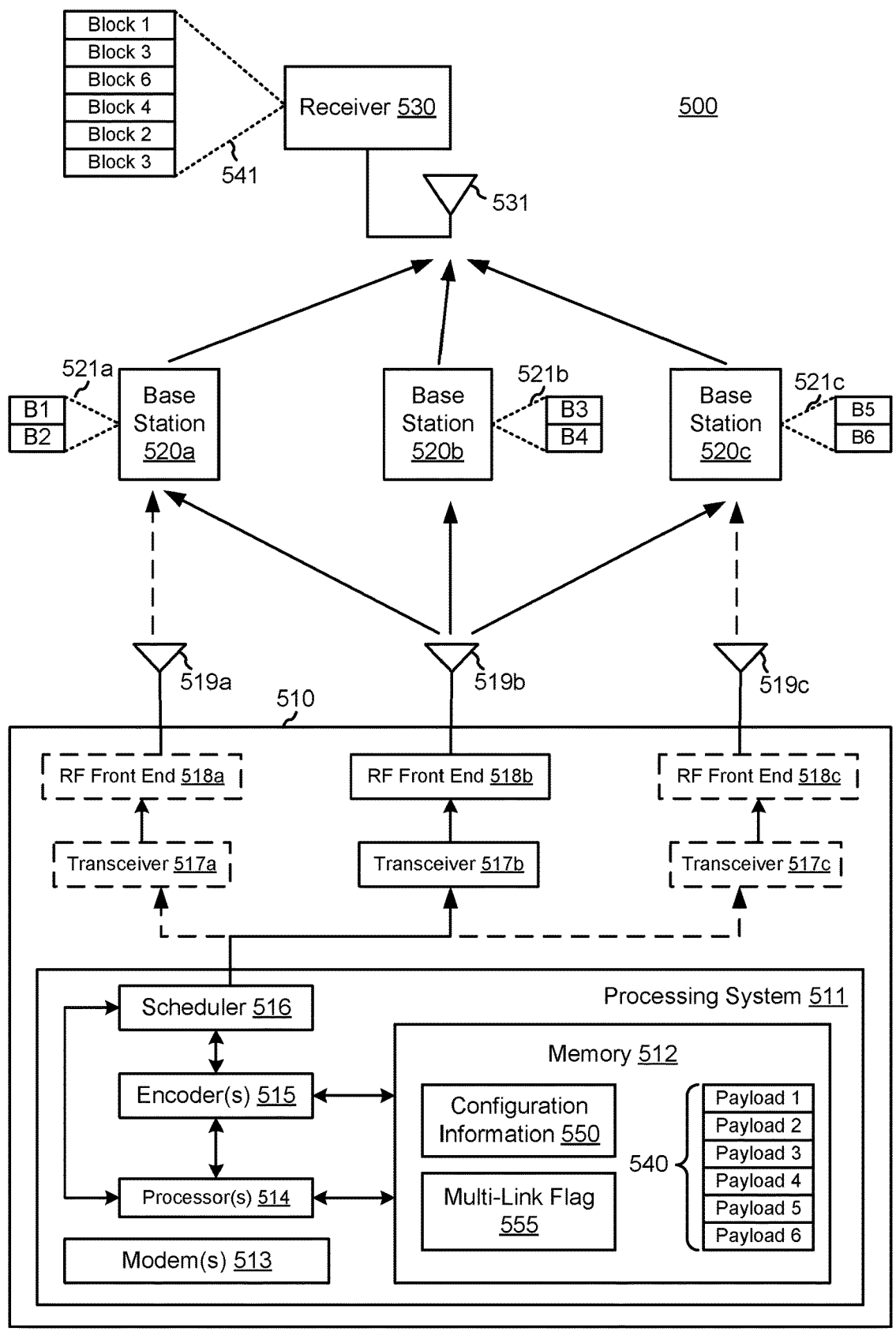
FIG. 5 is a diagram illustrating an example of a transmitting device preparing and transmitting a data sequence using a plurality of links in an access network.

FIG. 5 is a diagram illustrating an example of a transmitting device preparing and transmitting a data sequence using a plurality of links in an access network. Wireless system 500 includes a transmitter 510, base stations 520*a-c*, and a receiver 530. Transmitter 510 may use multiple links via base stations 520*a-c* to send a data sequence 540 that includes a sequence of transport blocks 1-6. Receiver 530 may receive the data blocks of the data sequence 540 out-of-order and may use components to attempt to reorder the data sequence 540 or request retransmission of one or more transport blocks in the data sequence 540. In an example, the transmitter 510 may be part of a UE (e.g., UE 106, 350) or webserver.

Transmitter 510 is similar to transmitter 410 and may include a processing system 511 and one or more transceivers 517*a-c*, RF front ends 518*a-c*, and antennas 519*a-c*. Transmitter 510 may use processing system 511 to encode data sequence 540 into multiple transport blocks 440 that are transmitted via one or more transceivers 517*a-c*, RF front ends 518*a-c*, and antennas 519*a-c* to base stations 520*a-c*. In an aspect, transmitter 510 can use a single transceiver 517*b*, RF front end 518*b*, and antenna 519*b* to transmit over multiple links to one or more base stations 520*a-c*. For example, transmitter 510 may use carrier aggregation to transmit over multiple frequencies using transmitter chain 517-519*b*. In an aspect, transmitter 510 can optionally use additional transceivers 517*a, c*, RF front ends 518*a, c*, and antennas 519*a, c* to transmit over multiple links via one or more base stations 520*a-c*.

In an aspect, processing system 511 can include memory 512, one or more modems 513, one or more processors 514, one or more encoders 515, and a scheduler 516. In an aspect, computer-executable code for encoder 515 and/or scheduler 516 may be included in memory 512, while the various functions related to encoder 515 and/or scheduler 516 may be included in modem 513 and/or processor 514. In an aspect, a single processor can execute the functions of encoder 515 and/or scheduler 516, while in other aspects, different ones of the functions may be executed by a combination of two or more different processors. For example, in an aspect, the one or more processors 514 may include any one or any combination of a modem processor, a baseband processor, a digital signal processor, a transmit processor, an application-specific integrated circuit (ASIC), or a transceiver processor associated with transceivers 517*a-c*. In particular, the one or more processors 514 may operate with memory 512 to execute operations and/or components included in or controlled by encoder 515 and/or scheduler 516.

In an aspect, transmitter 510 may use processing system 511 to implement one or more aspects of encoder 515 and/or scheduler 516 to encode data sequence 540 using one or more transport blocks 541 including headers for one or more layers in a protocol architecture such as an LTE protocol architecture. In an aspect, encoder 515 may include additional information, such as configuration information 550 and/or multi-link flag 555 in portions of the transport blocks 541 to indicate that the transport blocks 541 were transmitted using multiple links from the transmitter. In an aspect, encoder 515 and/or scheduler 516 may retransmit one or more transport blocks 541 in response to a retransmit request (e.g., a HARQ message, an ARQ message, and/or a duplicate ACK message).

In an aspect, processing system 511 of transmitter 510 may include memory 512 for storing data used herein (e.g., data sequence 540, configuration information 550, and/or multi-link flag 555) and/or local versions of applications and/or encoder 515 scheduler 516 and/or one or more of their subcomponents being executed by processor 514. Memory 512 can include any type of computer-readable medium usable by a computer or processor 514, such as random-access memory (RAM), read-only memory (ROM), tapes, magnetic discs, optical discs, volatile memory, non-volatile memory, and any combination thereof.

In an aspect, for example, memory 512 may be a non-transitory computer-readable storage medium that stores one or more computer-executable codes defining encoder 515 and/or scheduler 516 and/or one or more of their subcomponents, and/or data associated therewith. In such instances, transmitter 510 may operate processor 514 of processing system 511 to execute one or more functions of encoder 515, scheduler 516 and/or one or more of their subcomponents.

In an aspect, modem 513 can be a multiband-multimode modem, which can process digital data and communicate with transceivers 517a-c such that the digital data is sent and received using transceivers 517a-c. In an aspect, modem 513 can be multiband and be configured to support multiple frequency bands (e.g., multiple carrier components) for a specific communications protocol. In an aspect, modem 513 can be multimode and be configured to support multiple operating networks and communications protocols. In an aspect, modem 513 can control one or more components of transmitter 510 (e.g., transceivers 517a-c, RF front end 518a-c, antennas 519a-c) to enable transmission and/or reception of signals with receiver 530 via base stations 520a-c based on a specified modem configuration. In an aspect, the modem configuration can be based on the mode of modem 513 and the frequency band(s) in use.

Moreover, in an aspect, transmitter 510 may include transceivers 517a-c, RF front end 518a-c, and antennas 519a-c for receiving and transmitting radio transmissions, such as, for example, RLC layer Protocol data unit (PDU) 440, acknowledgement signals, and/or retransmission signals. In an aspect, transceivers 517a-c may be configured to modulate messages provided to the transceivers 517a-c by processing system 511 for transmission to receiver 530 via RF front end 518a-c and antennas 519a-c. In an aspect, transceivers 517a-c may be configured to demodulate messages received from receiver 530 via antennas 519a-c and RF front end 518a-c and send the messages to processing system 511. In an aspect, transceivers 517a-c may include a transmitter configured to transmit wireless signals and a receiver configured to receive wireless signals through antennas 519a-c via RF front end 518a-c. In an aspect, transceivers 517a-c may be tuned to operate at specified frequencies such that transmitter 510 can communicate with, for example, base stations 520a-c. In an aspect, for example, modem 513 can configure transceivers 517a-c to operate at specified frequencies and power levels based on the network configuration of transmitter 510 and communication protocol used by modem 513.

In an aspect, encoders 515 can include one or more layer encoders 411-417 that may retrieve a data sequence 540 including one or more data payloads and encapsulate the payloads to provide transport blocks 440, 541 to one or more transceivers 517a-c. In an aspect, when transmitter 510 is to send the data sequence 540 to receiver 530 using multiple logical and/or physical communications links, one or more of encoders 515 may retrieve configuration information 550 and/or multi-link flag 555 from memory 512 and add the information into a layer header and/or data payload. For example, in an aspect, TCP encoder 416 of encoder 515 may retrieve multi-link flag 555 and set the flag to indicate that no layer decoders before TCP decoder 436 should attempt reordering transport blocks 541 received out of order. TCP encoder 416 may add the flag to the TCP header such that lower-layer decoders 431-434 may read the contents of multi-link flag 555 in the data payload or the TCP header. In another aspect, the APP layer encoder 417, TCP encoder 416, and/or PDCP encoder 414 may, for example, retrieve configuration information 550, such as a non-volatile (NV) item or interface configuration, and add the configuration information 550 to the data payload. In an aspect, one or more decoders 431-436 may attempt or refrain from attempting reordering transport blocks 541 received out-of-order based on the contents of the configuration information.

In an aspect, transmitter 510 may send portions of data sequence 540 as one or more transport block portions 521a-c to receiver 530 via base stations 520a-c. In an aspect, base stations 520a-c are similar to relay device 420 (e.g., an access network node, for example, an eNB in LTE) and may decapsulate and re-encapsulate received transport blocks such that they are forwarded to receiver 530. In an aspect, each base station may be instructed (for example, through multi-link flag 555 included in each of transport blocks 541) to either attempt reordering or refrain from reordering their respective transport block portions 521a-c.

In an aspect, for example, transmitter 510 may generate multiple transport blocks 541 from data sequence 540 and may transmit transport blocks 541 via base stations 520a-c, with base station 520a-c receiving transport block portion 521a, base station 520b receiving transport block portion 521b, and base station 520c receiving transport block portion 521c. In an aspect, each communication link may have different properties (e.g., throughput, QCI, length, etc.) and receiver 530 may receive parts of transport block portions 521a-c at different times, out-of-order, and with different quality. As a result, receiver 530 may receive transport blocks 541 as out-of-order transport blocks 541. In an aspect, the communications link may include a quality-of-service (QoS) class indicator (QCI) that indicates whether, for example, to reorder non-sequentially received data packets at a particular layer. For example, in an aspect, a QCI of a communications link may indicate for a receiver 530 not to reorder non-sequential data packets at any of the L2 layers.

In an aspect, receiver 530 may be similar to receiver 530 and may receive data payloads as transport blocks 541 over one or more communications links via base stations 520a-c. In an aspect, receiver 530 may maintain high-layer connections (e.g., IP, TCP, and/or application layer connections) with transmitter 510 and may receive data packets either directly from transmitter 510 or through one or more relay devices like base stations 520a-c. In an aspect, receiver 530 may include one or more antennas 531 that may receive data transmissions from the one or more base stations 520a-c.

FIGS. 6A-6E are diagrams illustrating example receiving devices receiving and decoding a multiple data packets of a data sequence received over a plurality of links in an access network. Each of FIGS. 6A-6E illustrates a receiver 600 that is similar to receiver 430, 530 that may receive transport blocks 541 from transmitter 510. In an aspect, a UE (e.g., UE 106, 350) may include components of both transmitter 510 and receiver 600. Receiver 600 includes antennas 601a-c, transceiver/front ends 603a-c, and processing system 605. Processing system 605 can include one or more decoders 610-650 and a data payload 660.

Processing system 605 can include memory 606, one or more processors 607, one or more modems 608, decoders 610-650, and data payload 660. In an aspect, data payload 660 may be stored in memory 606. In an aspect, computer-executable code for decoders 610-650 may be included in memory 606, while the various functions related to decoders 610-650 may be included in modem 608 and/or processor 607. In an aspect, a single processor can execute the functions of decoders 610-650, while in other aspects, different ones of the functions may be executed by a combination of two or more different processors 607. For example, in an aspect, the one or more processors 607 may include any one or any combination of a modem processor, a baseband processor, a digital signal processor, a transmit processor, an application-specific integrated circuit (ASIC), or a transceiver processor associated with transceiver/front ends 603a-c. In particular, the one or more processors 607 may operate with memory 606 to execute operations and/or components included in or controlled by decoder 610-650.

In an aspect, receiver 600 may use processing system 605 to implement one or more aspects of decoders 610-650 to decode and/or reorder received transport blocks 541 to produce a data payload 660 that originated at least at transmitter 510. In an aspect, data payload 660 may match data sequence 540 stored in transmitter 510. In an aspect, receiver 600 may receive, via one or more of antennas 601a-c, transport blocks 541 from base stations 520a-c. One or more of transceiver/front ends 603a-c may process the received transport blocks 541 and send the transport blocks to processing system 605. Processing system 605 may use one or more decoders 610-650 to decapsulate and/or process layer headers from the transport blocks 541 to retrieve the resultant data payload. In an aspect, one or more of decoders 610-650 may attempt reordering transport blocks 541. In an aspect, one or more of decoders 610-650 may refrain from reordering transport blocks 541 based on information included in the transport blocks 541 and/or information provided by other decoders 610-650. For example, TCP decoder 640 may configure lower-layer decoders 610-630 via an internal message to either re-order or refrain from re-ordering transport blocks 541 that were received out-of-sequence.

Antennas 601a-c may be similar to antennas 519a-c of transmitter 510 and/or antenna 531 of receiver 530. Transceiver/front ends 603a-c may include a chain of a transceiver, which is similar to transceivers 517a-c, and an RF front end that is similar to RF front ends 518a-c included in transmitter 510. In an aspect, receiver 600 may use multiple transceiver/front ends 603a-c to receive transport block portions 521a-c from each of base stations 520a-c. In another aspect, receiver 600 may use a single transceiver/front end 603b to receive each of transport block portions 521a-c. Transceiver/front ends 603a-c may receive transport block portions 521a-c and may compile the portions into transport blocks 671. In an aspect, transport blocks 671 may be similar to transport blocks 541 received by receiver 530.

Processing system 605 may employ one or more decoders 610-650 to decapsulate and/or process layer headers included in each of the transport blocks. For example, in an aspect, processing system 605 may include a PHY decoder similar to PHY decoder 421, 431 in receiver 430, which may demodulate the received transport blocks and deliver the transport blocks 671 to MAC decoder 610. MAC decoder 610 is similar to MAC decoder 422, 432 and may decapsulate and process the MAC header included in the L2 frame produced by the PHY decoder.

In an aspect, MAC decoder 610 may also include a HARQ Check module 611, a scheduler 612, and a reordering timer 613. In an aspect, for example, MAC decoder may use scheduler 612 to determine whether one or more of transport blocks 671 were received out-of-order and may attempt to reorder the blocks. In an aspect, MAC decoder 610 may use reordering timer to wait for subsequent transport blocks 671 before performing the reordering procedure. In an aspect, MAC decoder 610 may use HARQ Check module 611 to generate HARQ messages to request specific transport blocks 541 from transmitter 510. In an aspect, MAC decoder 610 may use HARQ Check module 611 to send a retransmission request in the form of a HARQ message to transmitter 510 to retransmit one or more transport blocks 671 that were received in error. In an aspect, MAC decoder 610 may use HARQ Check module 611 to retransmit one or more transport blocks received out-of-order that were not placed in sequence by scheduler 612 before the reordering timer 613 expired. In an aspect, MAC decoder 610 may use HAQ Check module 611 to only send retransmission requests when data packets were received in error, refraining from sending retransmission requests when data packets were received out-of-sequence.

In an aspect, MAC Decoder 610 may use scheduler 612 to determine whether the received transport block 671 is out-of-order of the sequence originally sent by transmitter 510. For example, MAC Decoder may use scheduler 612 to examine the contents of the MAC headers for each of the received transport blocks to determine whether the sequence numbers for each of the transport blocks 671 is in order. For example, MAC Decoder 610 may use scheduler 612 to determine that the transport blocks 671 were received out-of-order. In an aspect, MAC decoder 610 may use scheduler 612 to determine whether to reorder the out-of-order transport blocks 671. For example, in FIG. 6A, scheduler 612 may determine that the scheduler 612 is to refrain from reordering the transport blocks and may simply decapsulate the transport blocks and deliver the out-of-order transport blocks 672 to RLC Decoder 620. In an aspect, scheduler 612 may determine whether to reorder the transport blocks 671 by examining the contents of the payload for configuration information 550 or a multi-link flag 555. In another aspect, scheduler 612 may receive a multi-link flag from a higher-layer decoder, such as indicator 645 from TCP decoder or indicator 655 from High-Layer Decoder 650.

RLC Decoder 620 is similar to RLC Decoder 423, 433 and includes an automatic repeat request (ARQ) Check module 621, a scheduler 622, and a timer 623. In an example, the scheduler 612 may determine that the scheduler 612 is to refrain from reordering the transport blocks and may simply decapsulate the transport blocks and deliver the out-of-order transport blocks 672 to RLC Decoder 620. RLC Decoder 620 may use scheduler 622 to determine whether the received transport block 672 is out-of-order of the sequence originally sent by base station 520 and may, in conjunction with timer 623, reorder non-sequential transport blocks 672. In an aspect, RLC Decoder 620 may use ARQ Check module 621 to generate ARQ messages to request specific transport blocks 541 from base station 520. In an aspect, for example, RLC Decoder 620 may use ARQ Check module 621 to send a retransmission request in the form of an ARQ message to base station 520 to retransmit one or more transport blocks 672 that were received in error. In an aspect, RLC Decoder 620 may use ARQ Check module 621 to retransmit one or more transport blocks received out-of-order that were not placed in sequence by scheduler 622 before the reordering timer 623 expired.

In an aspect, RLC Decoder 620 may use scheduler 622 to determine whether the received transport block 672 is non-sequential by examining the contents of the RLC headers for each of the received transport blocks 672 to determine whether the sequence numbers for each of the transport blocks 672 is in order. In an aspect, RLC Decoder 620 may use scheduler 622 to determine whether to reorder the non-sequential transport blocks 672. For example, in FIG. 6A, scheduler 622 may determine that the scheduler 622 is to refrain from reordering the transport blocks 672 and may only decapsulate the transport blocks 672 and deliver the out-of-order transport blocks 672 to PDCP Decoder 630 as transport blocks 673.

In an example, PDCP Decoders 630 may be similar to RLC Decoders 620. In an aspect, PDCP Decoder 630 may be similar to PDCP Decoder 424, 434 and may include scheduler 632 and timer 633. In an aspect, PDCP Decoder 630 may use scheduler 632 to determine whether the received transport block 673 is non-sequential to the sequence originally sent by base station 520 and may, in conjunction with timer 633, reorder non-sequential transport blocks 673. In an aspect, PDCP Decoder 630 may use scheduler 632 to determine whether the received transport block 673 is non-sequential by examining the contents of the PDCP headers for each of the received transport blocks 673 to determine whether the sequence numbers for each of the transport blocks 673 is in order. In an aspect, PDCP Decoder 630 may use scheduler 632 to determine whether to reorder the non-sequential transport blocks 673. For example, in FIG. 6A, scheduler 632 may determine that the scheduler 632 is to refrain from reordering the transport blocks 673 and may only decapsulate the transport blocks 673 and deliver the out-of-order transport blocks 674 to IP decoder which decapsulates the transport blocks 674 and then deliver the decapsulated transport blocks to TCP Decoder 640.

TCP Decoder 640 is similar to TCP Decoder 435 and includes an ACK Check module 641, scheduler 642, timer 643, and indicator 645. TCP Decoder 640 may use scheduler 642 to determine whether the received transport block 674 is deemed out-of-order compared to the sequence originally sent by transmitter 510 and may, in conjunction with timer 643, reorder non-sequential transport blocks 674. In an aspect, TCP Decoder 640 may use ACK Check module 641 to generate ACK messages in response to successfully-received transport blocks 674. In an aspect, scheduler 642 may prevent ACK Check module 641 from sending the ACK messages back to the TCP data transmitter 510; this may occur, for example, when the reordering timer 643 is running and the ACK Check module 641 is attempting to transmit duplicate ACK messages to transmitter 510. In an aspect, for example, transmitter 510 may refrain from sending duplicate ACK messages. In an aspect, scheduler 642 may prevent ACK Check module 641 from sending duplicate ACK messages to transmitter 510 until after the timer 643 expires.

In an aspect, TCP Decoder 640 may use scheduler 642 to determine whether the received transport block 674 is non-sequential by examining, for example, the contents of the TCP headers for each of the received transport blocks 674 to determine whether the sequence numbers for each of the transport blocks 674 is in order. In an aspect, TCP Decoder 640 may use scheduler 642 to determine whether to reorder the non-sequential transport blocks 674. For example, in FIG. 6A, scheduler 642 may determine that the scheduler 642 is to refrain from reordering the transport blocks 674 and may only decapsulate the transport blocks 672 and deliver the out-of-order transport blocks 675 to High-Layer Decoder 650.

In an aspect, TCP Decoder 640 may also include an indicator (e.g., a multi-link flag) 645. Indicator 645 may be similar but independent of multi-link flag 555 that may be included in the data payload or one of the headers of transport blocks 671-675. In an aspect, indicator 645 may specify whether the TCP Decoder 640 will determine and reorder non-sequential data packets for a specific data flow. In an aspect, TCP Decoder 640 may use, for example, scheduler 642 to set the configuration of indicator 645 and may send indicator 645 to one or more of lower-layer decoders 610-630 such that the one or more of decoders 610-630 refrain from attempts at reordering non-sequential transport blocks. For example, in an aspect, TCP decoder 640 may set and send indicator 645 before the reception of transport block 671 to decoders 610-630, with the indicator 645 indicating that each of decoders 610-630 refrain from reordering received non-sequential transport blocks 671-673.

In an aspect, TCP Decoder 640 may adjust timer 643 based on measurements performed by TCP Decoder 640 and/or processing system 605. For example, TCP Decoder 640 may examine how the non-sequential data packets are received from the lower-layer decoders 610-630. For example, TCP Decoder 640 may examine transport block 674 from PDCP Decoder 640 and may increase the time allowed in timer 643 when the number of non-sequential blocks increase and may decrease the time allowed in timer 643 when the number of non-sequential blocks decreases. In an aspect, the timer may be set based on a specified number of received data packets in a data flow; for example, the timer may be based on the ten most-recently received blocks by TCP Decoder 640. In an aspect, TCP Decoder 640 may adjust timer 643 based on or based on the recommended value from lower-layer decoders 610-630.

High-Layer Decoder 650 may be a decoder that decapsulates and processes one or more layers above the TCP layer. For example, for FIGS. 6A-6B High-Layer Decoder 650 may be similar to application decoder 437 and includes scheduler 652, timer 653, and indicator 655. High-Layer Decoder 650 may use scheduler 652 to determine whether the received transport block 675 is deemed out-of-order compared to the sequence originally sent by transmitter 510 (e.g., UE or webserver) and may, in conjunction with timer 653, reorder non-sequential transport blocks 654. For example, in an aspect, High-Layer Decoder 650 may reorder received messages that include multimedia in the data payload (e.g., voice and/or video packets). In an aspect, High-Layer Decoder 650 may use scheduler 652 to determine whether the received transport block 675 is non-sequential by examining, for example, the contents of the high-layer headers (e.g., application-layer headers) for each of the received transport blocks 675 to determine whether the sequence numbers for each of the transport blocks 675 is in order. In an aspect, High-Layer Decoder 650 may use scheduler 652 to determine whether to reorder the non-sequential transport blocks 675. For example, in FIG. 6A, scheduler 642 may determine that the scheduler 642 is to reorder the transport blocks 674 and may also decapsulate the transport blocks 675 and provide in-sequence transport blocks 676 as data payload 660. In an aspect, data payload 660 may match the data sequence 540 originally stored in transmitter 510. In an aspect, High-Layer Decoder 650 may, in a manner similar to TCP Decoder 640, readjust the time allowed by timer 653 based on the data packets received from lower-layer decoders 610-640 or based on the recommended value from lower-layer decoders 610-640.

In an aspect, High-Layer Decoder 650 may also include an indicator 655. Indicator 655 may be similar but independent of multi-link flag 555 that may be included in the data payload or one of the headers of transport blocks 671-675. In an aspect, High-Layer Decoder 650 may use, for example, scheduler 652 to set the configuration of indicator 655 and may send indicator 655 to one or more of decoders 610-650 such that the one or more of decoders 610-650 refrain from attempts at reordering non-sequential transport blocks 671-675. For example, in an aspect, High-Layer Decoder 650 may set and send indicator 655 before the reception of transport block 671 to decoders 610-640, with the indicator 655 indicating that each of decoders 610-630 refrain from reordering received non-sequential transport blocks 671-673.

In an aspect, the indicator 645, 655 sent from decoders 640-650 may include information for specific reordering schemes that indicates for a subset of decoder 610-650 to reorder detected non-sequential sequences of data packets. For example, in an aspect, an indicator 645, 655 may indicate that PDCP Decoder 630 refrain from reordering, while enabling MAC Decoder 610, RLC Decoder 620 and TCP Decoder 640 to reorder any detected out-of-order transport blocks 671, 672, 674. In an aspect, other combinations of enabled and disabled reordering by decoders 610-640 may also be included in indicator 645, 655. In an aspect, receiver 600 may send indicators 645, 655 to transmitter 510 such that transmitter 510 does not configure the PDCP decoder 630 or RLC decoder 620 for reordering. In another aspect, receiver 600 may send indicators 645, 655 to base station 520 such that base station 520 does not configure base station 520's PDCP decoder or RLC decoder for reordering.

Figure 6A:
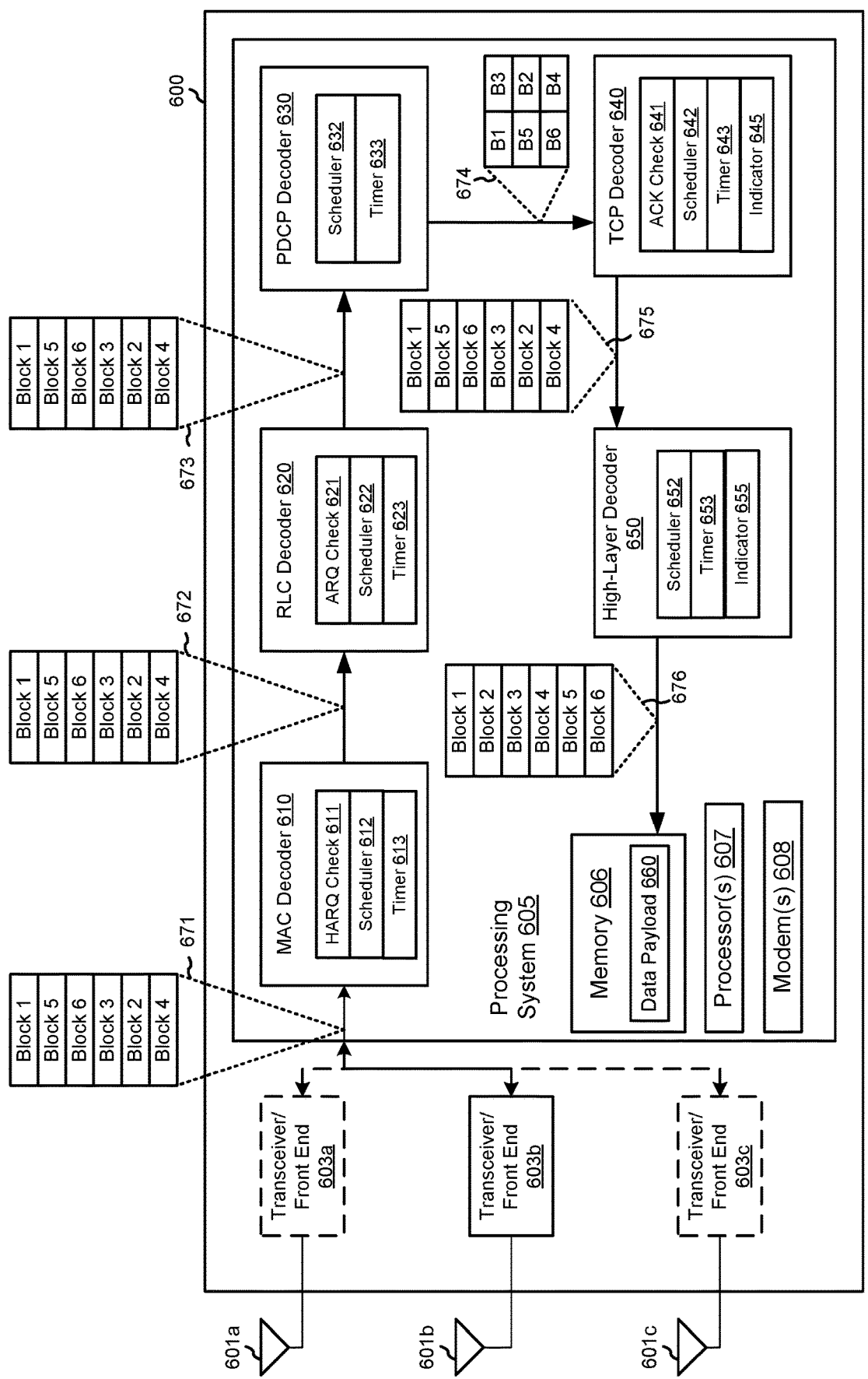
FIGS. 6A-6E are diagrams illustrating example receiving devices receiving and decoding a multiple data packets of a data sequence received over a plurality of links in an access network.
Figure 6B:
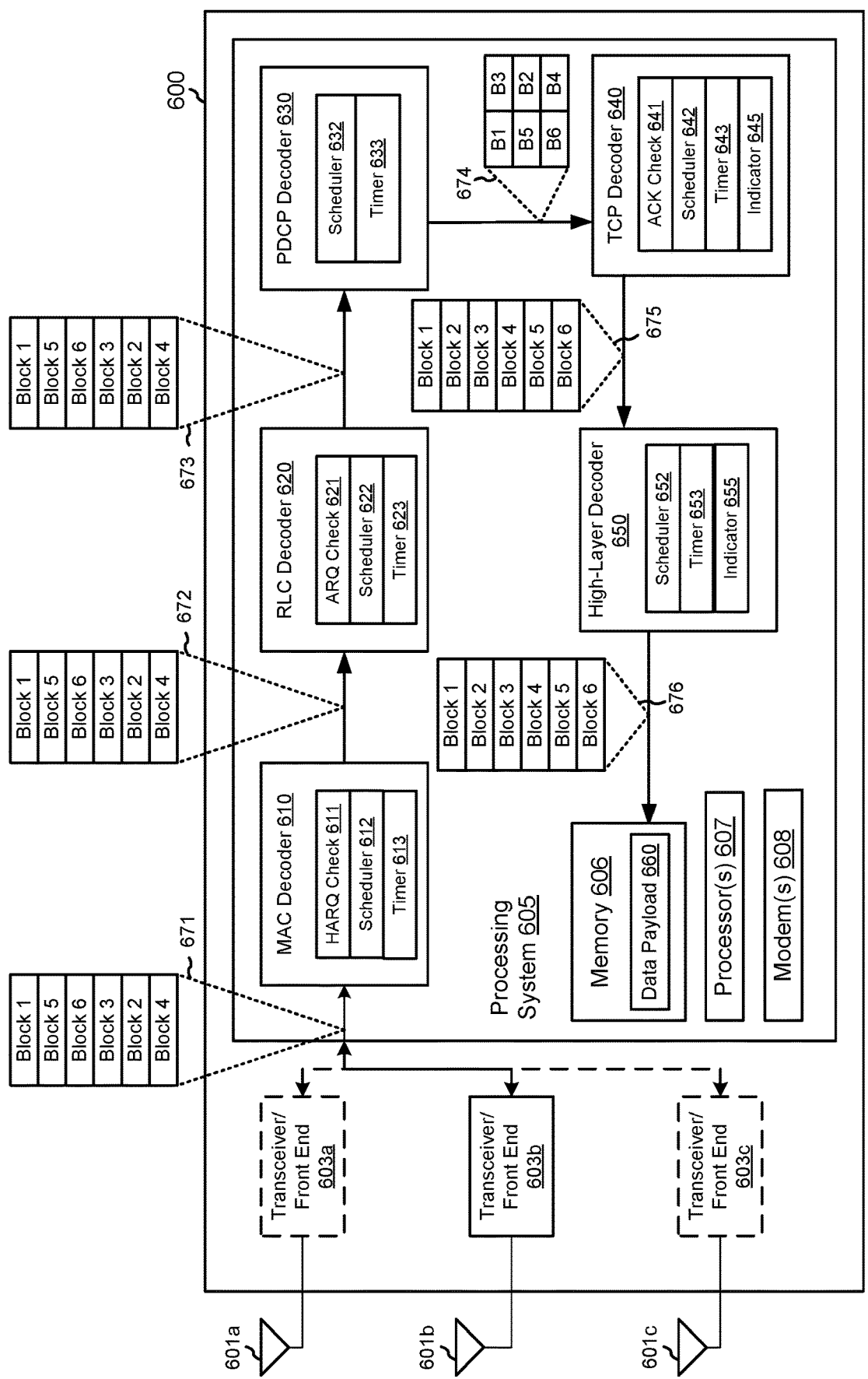

FIGS. 6B-6E are similar to FIG. 6A, as receiver 600 includes at least one decoder 610-650 that is enabled to reorder detected non-sequential transport blocks 671-675. FIG. 6B illustrates a receiver 600 including a TCP Decoder 640 that is enabled to reorder non-sequential transport blocks 674 to provide in-sequence transport blocks 675 to High-Layer Decoder 650. In an aspect, High-Layer Decoder 650 may also attempt to reorder non-sequential transport blocks 675, but may not detect that the transport blocks 675 are out-of-order.

Figure 6C:
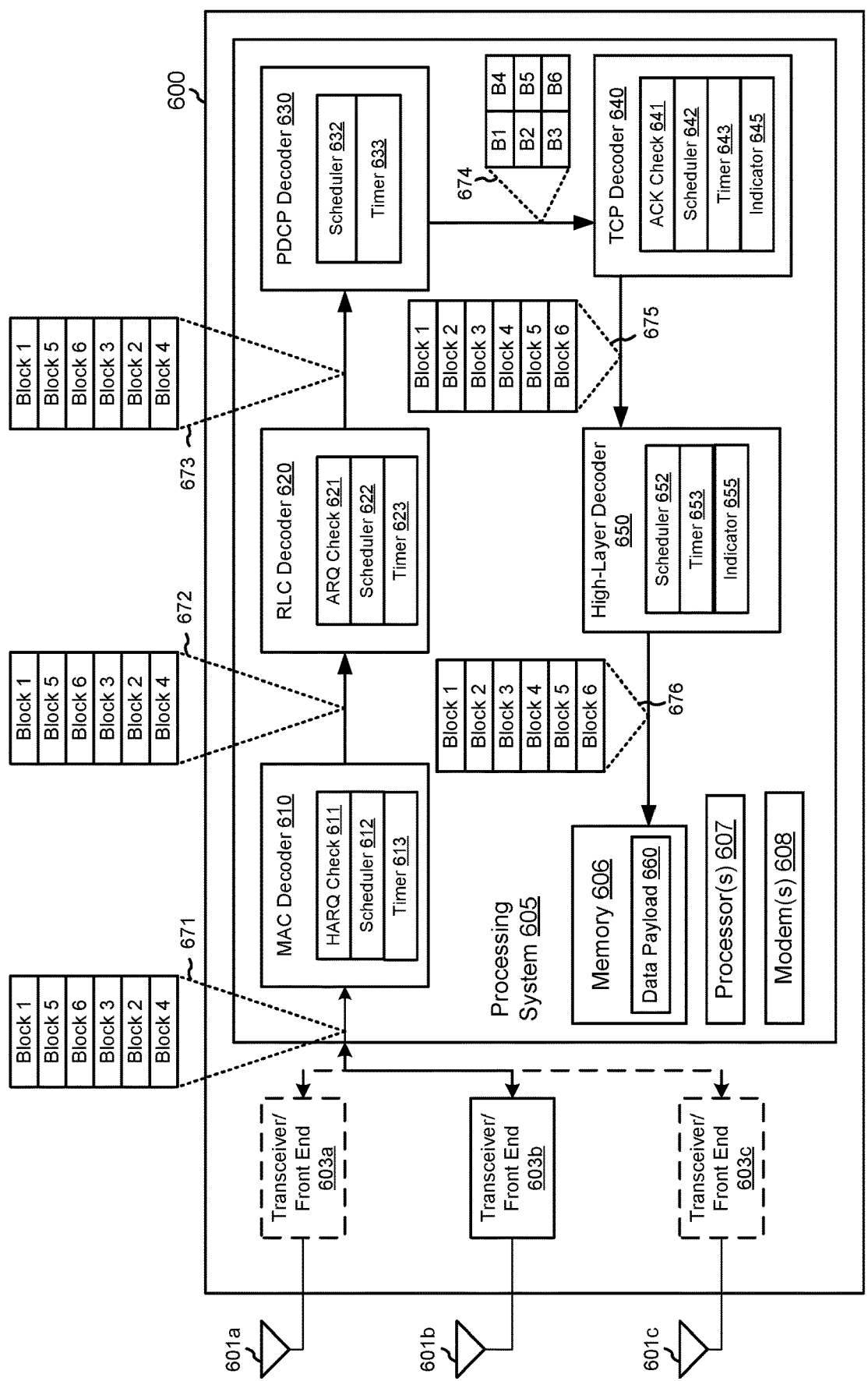

FIG. 6C illustrates a receiver 600 including a PDCP Decoder 630 that is enabled to reorder non-sequential transport blocks 673 to provide in-sequence transport blocks 674 to TCP Decoder 640. In an aspect, TCP Decoder 640 and/or High-Layer Decoder 650 may also attempt to reorder non-sequential transport blocks 674, 675, but may not detect that the transport blocks 674, 675 are out-of-order.

Figure 6D:
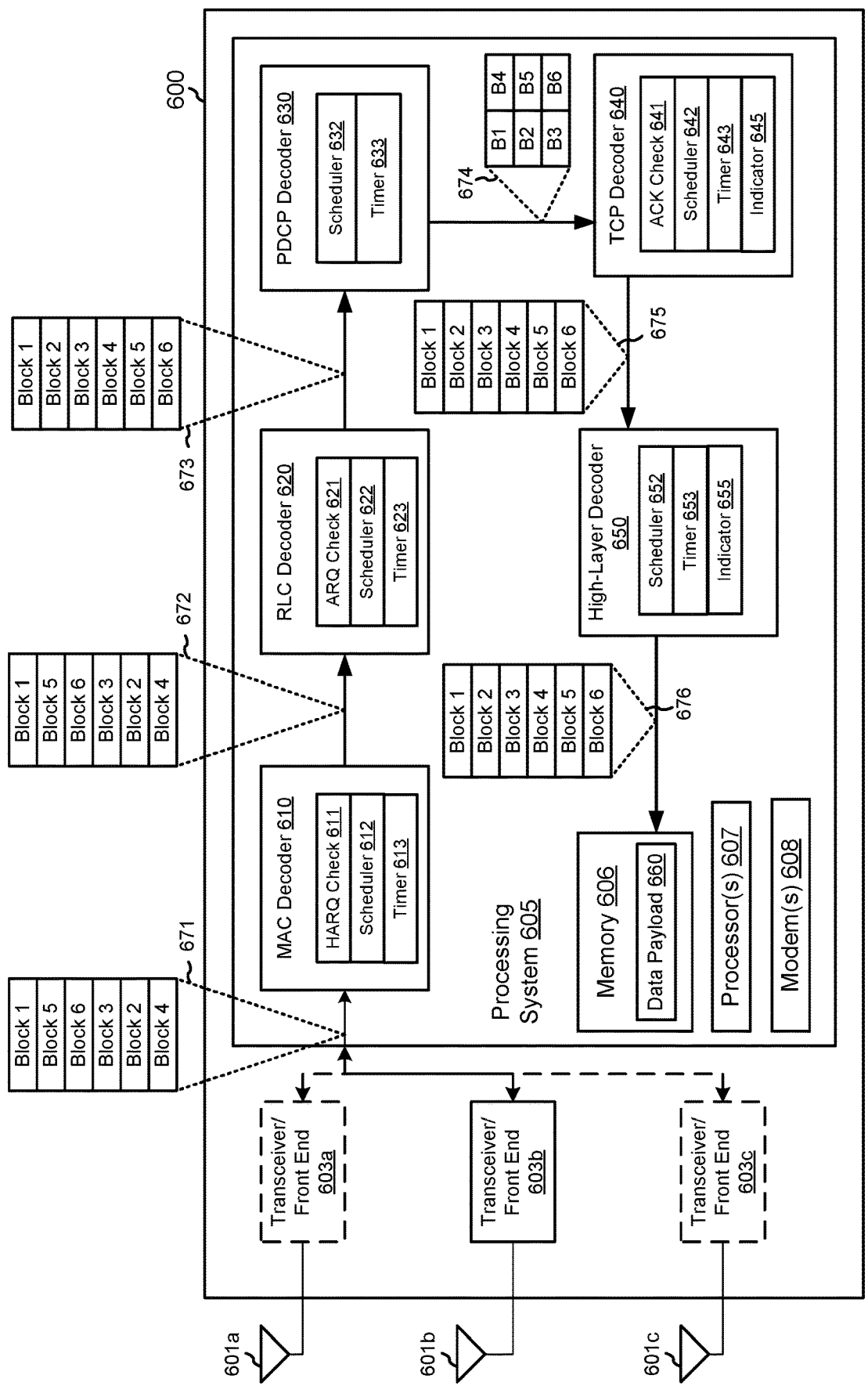

FIG. 6D illustrates a receiver 600 including an RLC Decoder 620 that is enabled to reorder non-sequential transport blocks 672 to provide in-sequence transport blocks 673 to PDCP Decoder 630. In an aspect, PDCP Decoder 630, TCP Decoder 640 and/or High-Layer Decoder 650 may also attempt to reorder non-sequential transport blocks 673-675.

Figure 6E:
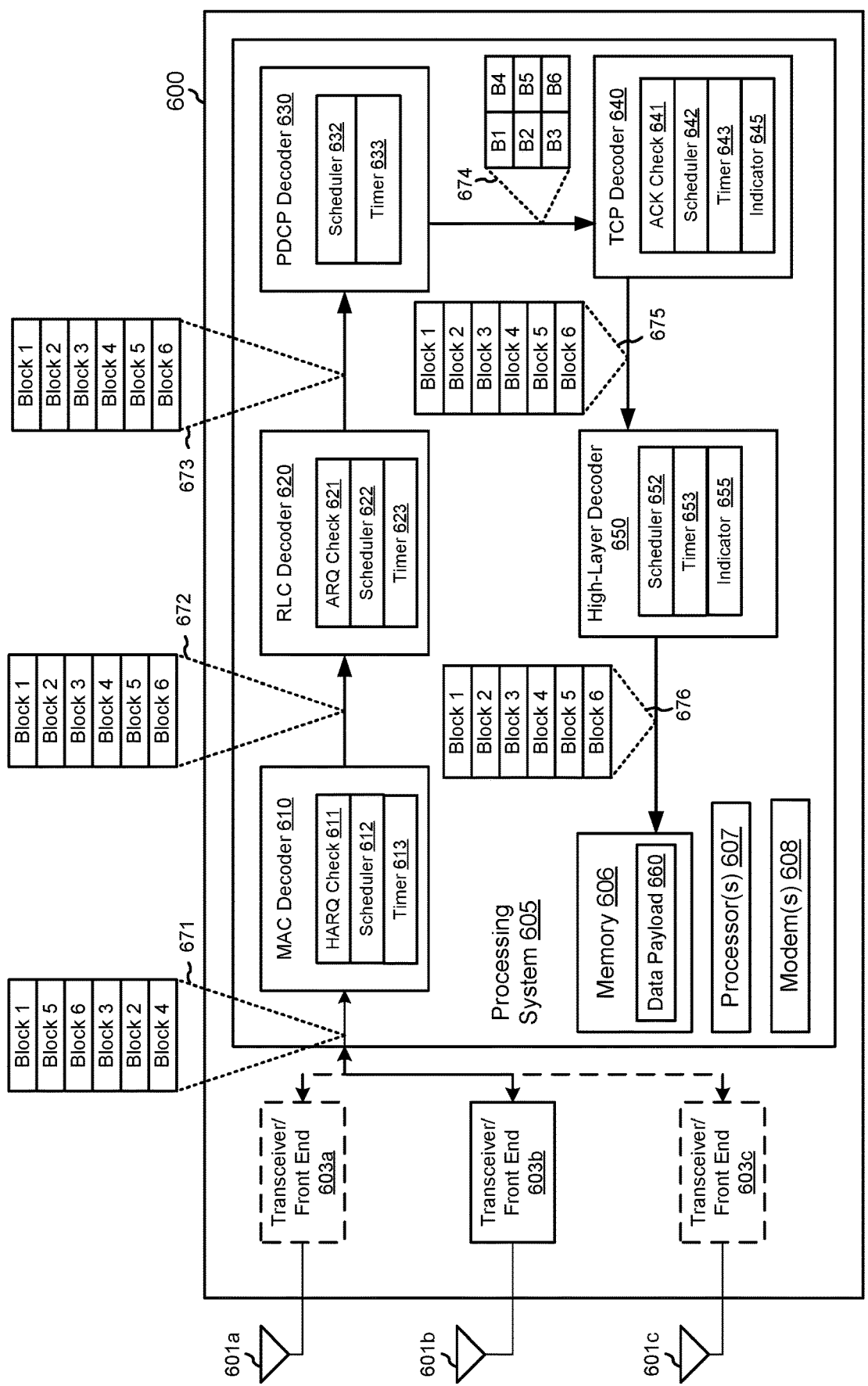

FIG. 6E illustrates a receiver 600 including a MAC Decoder 610 that is enabled to reorder non-sequential transport blocks 671 to provide in-sequence transport blocks 672 to RLC Decoder 620. In an aspect, one or more of decoders 630-650 may also attempt to reorder non-sequential transport blocks 672-675.

In a first example, an apparatus for communications (104, 106, 310, 350, 410, 430, 530, 520) includes a processing system (316, 356, 359, 368, 370, 375, 511, 605) configured to support a protocol stack (200) including a first layer (e.g., RLC) and a second layer (e.g., PDCP). The processing system (316, 356, 359, 368, 370, 375, 511, 605) may be further configured to receive a plurality of data packets (442) (e.g., within the RLC layer Protocol data unit (PDU) 440). Each of the data packets may include a first segment (e.g., RLC layer Protocol data unit (PDU) 440) for processing at the first layer (e.g., RLC). Additionally, each of the first segments may include a first header (e.g., RLC header) and a first payload (e.g., data payload (442) within the RLC layer PDU 440). Each of the first payloads (e.g., data payload (442) within the RLC layer PDU 440) may include a second segment (444) having a second header (e.g., PDCP header) and a second payload (e.g., PDCP payload). The processing system (316, 356, 359, 368, 370, 375, 511, 605) may be further configured to determine, at the first layer (e.g., RLC), whether to reorder the second segments for in-sequence delivery to the second layer (e.g., PDCP) based on information in one or more of the second headers.

In one aspect, the processing system (316, 356, 359, 368, 370, 375, 511, 605) may be further configured to reorder, based on the determination at the first layer (e.g., RLC), the second segments for in-sequence delivery to the second layer (e.g., PDCP).

In one aspect, the information in the one or more of the second headers includes a flag that indicates whether to reorder the second segments at the first layer (e.g., RLC) for in-sequence delivery to the second layer (e.g., PDCP).

In one aspect, the processing system (316, 356, 359, 368, 370, 375, 511, 605) may be further configured to receive the plurality of data packets over a plurality of logical connections.

In one aspect, each of the plurality of logical connections may be associated with a quality-of-service (QoS) class indicator (QCI) that indicates whether to reorder the second segments at the first layer (e.g., RLC).

In one aspect, the processing system (316, 356, 359, 368, 370, 375, 511, 605) may be further configured to determine, at the first layer (e.g., RLC), whether the second segments are in sequence and reorder, based on the determination at the first layer (e.g., RLC), the second segments for in-sequence delivery to the second layer (e.g., PDCP).

In one aspect, the processing system (316, 356, 359, 368, 370, 375, 511, 605) may be further configured to wait for up to a defined period to receive additional data packets of the plurality of data packets.

In one aspect, the processing system (316, 356, 359, 368, 370, 375, 511, 605) may be further configured to reorder, based on the determination at the first layer (e.g., RLC), the second segments for in-sequence delivery to the second layer (e.g., PDCP).

In one aspect, the processing system (316, 356, 359, 368, 370, 375, 511, 605) may be further configured to adjust the defined period based on at least one measurement related to the plurality of data packets.

In one aspect, the information in the one or more of the second headers or in the configuration information from the processing system indicates to the first layer (e.g., RLC) to refrain from reordering the first segments at the first layer, determine whether one or more of the first segments were received in error or lost, and request retransmission of the one or more of the first segments received in error or lost.

In a second example, an apparatus for communications (104, 106, 310, 350, 410, 430, 530, 520) includes a processing system (316, 356, 359, 368, 370, 375, 511, 605) configured to support a protocol stack (200) may include a first layer (e.g., RLC) and a second layer (e.g., PDCP). The processing system (316, 356, 359, 368, 370, 375, 511, 605) may be further configured to receive a plurality of data packets (e.g., within the RLC layer Protocol data unit (PDU) 440). Each of the data packets may include a first segment for processing at the first layer (e.g., RLC). Each of the first segments may include a first header and a first payload (e.g., data payload (442) within the transport block 440). Each of the first payloads (e.g., data payload (442) within the RLC layer Protocol data unit (PDU) 440) may also include a second segment having a second header and a second payload. The processing system (316, 356, 359, 368, 370, 375, 511, 605) may also be further configured to deliver the second segments to the second layer (e.g., PDCP) and determine, at the second layer (e.g., PDCP), whether the second segments were reordered at the first layer (e.g., RLC) for in-sequence delivery to the second layer (e.g., PDCP) based on information in one or more of the second headers.

In one aspect, the processing system (316, 356, 359, 368, 370, 375, 511, 605) may be further configured to reorder, based on the determination at the second layer (e.g., PDCP), the second segments for in-sequence delivery to the second layer (e.g., PDCP).

In one aspect, the information in the one or more of the second headers includes a flag that indicates whether the second segments were reordered at the first layer (e.g., RLC).

In one aspect, the processing system (316, 356, 359, 368, 370, 375, 511, 605) may be further configured to receive the plurality of data packets over a plurality of logical connections.

In one aspect, each of the plurality of logical connections are associated with a QCI that indicates whether the second segments are reordered at the first layer (e.g., RLC).

In one aspect, the processing system (316, 356, 359, 368, 370, 375, 511, 605) may be further configured to reorder the second segments when the second segments were not reordered at the first layer (e.g., RLC).

In one aspect, the processing system (316, 356, 359, 368, 370, 375, 511, 605) may be further configured to wait for up to a defined period to receive additional data packets of the plurality of data packets.

In one aspect, the processing system (316, 356, 359, 368, 370, 375, 511, 605) may be further configured to reorder the second segments when the second segments were not reordered at the first layer (e.g., RLC).

In one aspect, the processing system (316, 356, 359, 368, 370, 375, 511, 605) may be further configured to adjust the defined period based on at least one measurement related to the plurality of data packets.

The information in the one or more of the second headers indicates to the second layer (e.g., PDCP) to: refrain from reordering the second segments at the second layer, determine whether one or more of the first segments was received in error or lost at the first layer, and request retransmission of the one or more of the first segments received in error or lost at the first layer.

In a third example, an apparatus for communications (104, 106, 310, 350, 410, 430, 530, 520) includes a processing system (316, 356, 359, 368, 370, 375, 511, 605) configured to support a protocol stack (200) may include a first layer (e.g., RLC) and a second layer (e.g., PDCP). The processing system (316, 356, 359, 368, 370, 375, 511, 605) may be further configured to establish a flow with a node (104, 106, 310, 350, 410, 430, 530, 519, 521, 600), the establishment including receiving configuration information, wherein the flow may be associated with a plurality of data packets (e.g., within the RLC layer Protocol data unit (PDU) 440). Each of the data packets may include a first segment for processing at the first layer (e.g., RLC), each of the first segments may include a first header and a first payload (e.g., data payload (442) within the RLC layer Protocol data unit (PDU) 440), and each of the first payloads (e.g., data payload (442) within the RLC layer Protocol data unit (PDU) 440) may include a second segment having a second header and a second payload, and determine whether to reorder the second segments at the first layer (e.g., RLC) for in-sequence delivery to the second layer (e.g., PDCP) based on the configuration information.

In an aspect, the configuration information or capability indicates the second layer (e.g., PDCP) does not require the first layer to perform reordering of the second segments.

In one aspect, the configuration information or capability indicates that the second layer (e.g., PDCP) may be configured to reorder the second segments.

In an aspect, the processing system (316, 356, 359, 368, 370, 375, 511, 605) may be further configured to signal, to the node (104, 106, 310, 350, 410, 430, 530, 519, 521, 600), an indication of whether first layer (e.g., RLC) may be configured to reorder the second segments for in-sequence delivery to the second layer (e.g., PDCP).

In an aspect, the configuration information or capability information indicates whether the second layer (e.g., PDCP) may be configured to refrain from reordering the second segments at the second layer, determine whether one or more of the first segments was received in error or lost at the first layer, and request retransmission of the one or more of the first segments received in error or lost at the first layer.

In an aspect, the processing system (316, 356, 359, 368, 370, 375, 511, 605) may be further configured to receive the plurality of data packets over a plurality of logical connections.

In an aspect, each of the plurality of logical connections are associated with a QCI that indicates whether the second segments are reordered at the first layer (e.g., RLC).

In an aspect, the processing system (316, 356, 359, 368, 370, 375, 511, 605) may be further configured to wait for up to a defined period to receive more of the second segments.

In an aspect, the processing system (316, 356, 359, 368, 370, 375, 511, 605) may be further configured to reorder the second segments when the second segments were not reordered at the first layer (e.g., RLC).

In an aspect, the processing system (316, 356, 359, 368, 370, 375, 511, 605) may be further configured to adjust the defined period based on at least one measurement related to the plurality of data packets.

In a fourth example, an apparatus for communications (104, 106, 310, 350, 410, 430, 530, 520) includes a processing system (316, 356, 359, 368, 370, 375, 511, 605) configured to establish a flow with a node (104, 106, 310, 350, 410, 430, 530, 519, 521, 600) supporting a protocol stack (200) having a first layer (e.g., RLC) and a second layer (e.g., PDCP). The flow may be associated with a plurality of data packets (e.g., within the RLC layer Protocol data unit (PDU) 440). Each of the data packets may include a first segment for processing at the first layer (e.g., RLC). Each of the first segments may include a first header and a first payload (e.g., data payload (442) within the RLC layer Protocol data unit (PDU) 440). Additionally, each of the first payloads (e.g., data payload within the RLC layer Protocol data unit (PDU) 440) may include a second segment may have a second header and a second payload. The establishment of the flow may include transmitting configuration information or capability information to the node (104, 106, 310, 350, 410, 430, 530, 519, 521, 600) indicating whether to reorder the second segments at the first layer (e.g., RLC) for in-sequence delivery to the second layer (e.g., PDCP).

In an aspect, the configuration information or capability information indicates the second layer (e.g., PDCP) does not require the first layer to perform reordering of the second segments In an aspect, the configuration information or capability information indicates that the second layer (e.g., PDCP) may be configured to reorder the second segments.

In an aspect, the processing system (316, 356, 359, 368, 370, 375, 511, 605) may be further configured to signal, to the node (104, 106, 310, 350, 410, 430, 530, 519, 521, 600), an indication of whether first layer (e.g., RLC) may be configured to reorder the second segments for in-sequence delivery to the second layer (e.g., PDCP).

In an aspect, the configuration information or capability information indicates whether the second layer (e.g., PDCP) may be configured to refrain from reordering the second segments at the second layer, determine whether one or more of the first segments was received in error or lost at the first layer, and request retransmission of the one or more of the first segments received in error or lost at the first layer.

In an aspect, the processing system (316, 356, 359, 368, 370, 375, 511, 605) may be further configured to receive the plurality of data packets over a plurality of logical connections.

In an aspect, each of the plurality of logical connections are associated with a QCI that indicates whether the second segments are reordered at the first layer (e.g., RLC).

In an aspect, the processing system (316, 356, 359, 368, 370, 375, 511, 605) may be further configured to wait for up to a defined period to receive more of the second segments.

In an aspect, the processing system (316, 356, 359, 368, 370, 375, 511, 605) may be further configured to reorder the second segments when the second segments were not reordered at the first layer (e.g., RLC).

In an aspect, the processing system (316, 356, 359, 368, 370, 375, 511, 605) may be further configured to adjust the defined period based on at least one measurement related to the plurality of data packets.

In a fifth example, an apparatus for communications (104, 106, 310, 350, 410, 430, 530, 520) includes a processing system (316, 356, 359, 368, 370, 375, 511, 605) configured to support a protocol stack (200) may include a first layer (e.g., RLC) and a second layer (e.g., PDCP). The processing system (316, 356, 359, 368, 370, 375, 511, 605) may be further configured to receive a plurality of data packets (e.g., within the RLC layer Protocol data unit (PDU) 440) over a plurality of logical connections. Each of the data packets may include a first segment for processing at the first layer (e.g., RLC), each of the first segments may include a first header and a first payload (e.g., data payload (442) within the RLC layer Protocol data unit (PDU) 440), and each of the first payloads (e.g., data payload (442) within the RLC layer Protocol data unit (PDU) 440) may include a second segment (444) having a second header and a second payload, and determine whether to reorder the second segments (444) at the first layer (e.g., RLC) for in-sequence delivery to the second layer (e.g., PDCP) based on whether the data packets are related to a common flow.

In an aspect, the processing system (316, 356, 359, 368, 370, 375, 511, 605) may be further configured to establish a flow with a node (104, 106, 310, 350, 410, 430, 530, 519, 521, 600), wherein the processing system (316, 356, 359, 368, 370, 375, 511, 605) determines whether to reorder the second segments (444) at the first layer (e.g., RLC) during the establishment of the flow.

In an aspect, the processing system (316, 356, 359, 368, 370, 375, 511, 605) may be further configured to register with a communications network, including sending an indication of whether the processing system (316, 356, 359, 368, 370, 375, 511, 605) may be configured to reorder the second segments (444) at the first layer (e.g., RLC) for in-sequence delivery to the second layer (e.g., PDCP), wherein the communications network sends the indication to a node (104, 106, 310, 350, 410, 430, 530, 519, 521, 600) when establishing a flow with the node (104, 106, 310, 350, 410, 430, 530, 519, 521, 600).

In an aspect, the processing system (316, 356, 359, 368, 370, 375, 511, 605) may be further configured to reorder, based on the determination at the first layer (e.g., RLC), the second segments (444) for in-sequence delivery to the second layer (e.g., PDCP).

In an aspect, each of the plurality of logical connections are associated with a QCI that indicates whether to reorder the second segments (444) at the first layer (e.g., RLC).

In an aspect, the processing system (316, 356, 359, 368, 370, 375, 511, 605) may be further configured to determine, at the first layer (e.g., RLC), whether the second segments are in sequence, and reorder, based on the determination at the first layer (e.g., RLC), the second segments (444) for in-sequence delivery to the second layer (e.g., PDCP).

In an aspect, the processing system (316, 356, 359, 368, 370, 375, 511, 605) may be further configured to wait for up to a defined period to receive additional data packets of the plurality of data packets.

In an aspect, the processing system (316, 356, 359, 368, 370, 375, 511, 605) may be further configured to reorder, based on the determination at the first layer (e.g., RLC), the second segments (444) for in-sequence delivery to the second layer (e.g., PDCP).

In an aspect, the processing system (316, 356, 359, 368, 370, 375, 511, 605) may be further configured to adjust the defined period based on at least one measurement related to the plurality of data packets.

In an aspect, the information in the one or more of the second headers indicates to the first layer (e.g., RLC) to refrain from reordering the first segments (440), at the second layer, determine whether one or more of the second segments (444) at the second layer was received in error or lost, and request retransmission of the one or more of the first segments (444) received in error or lost at the first layer.

Figure 7:
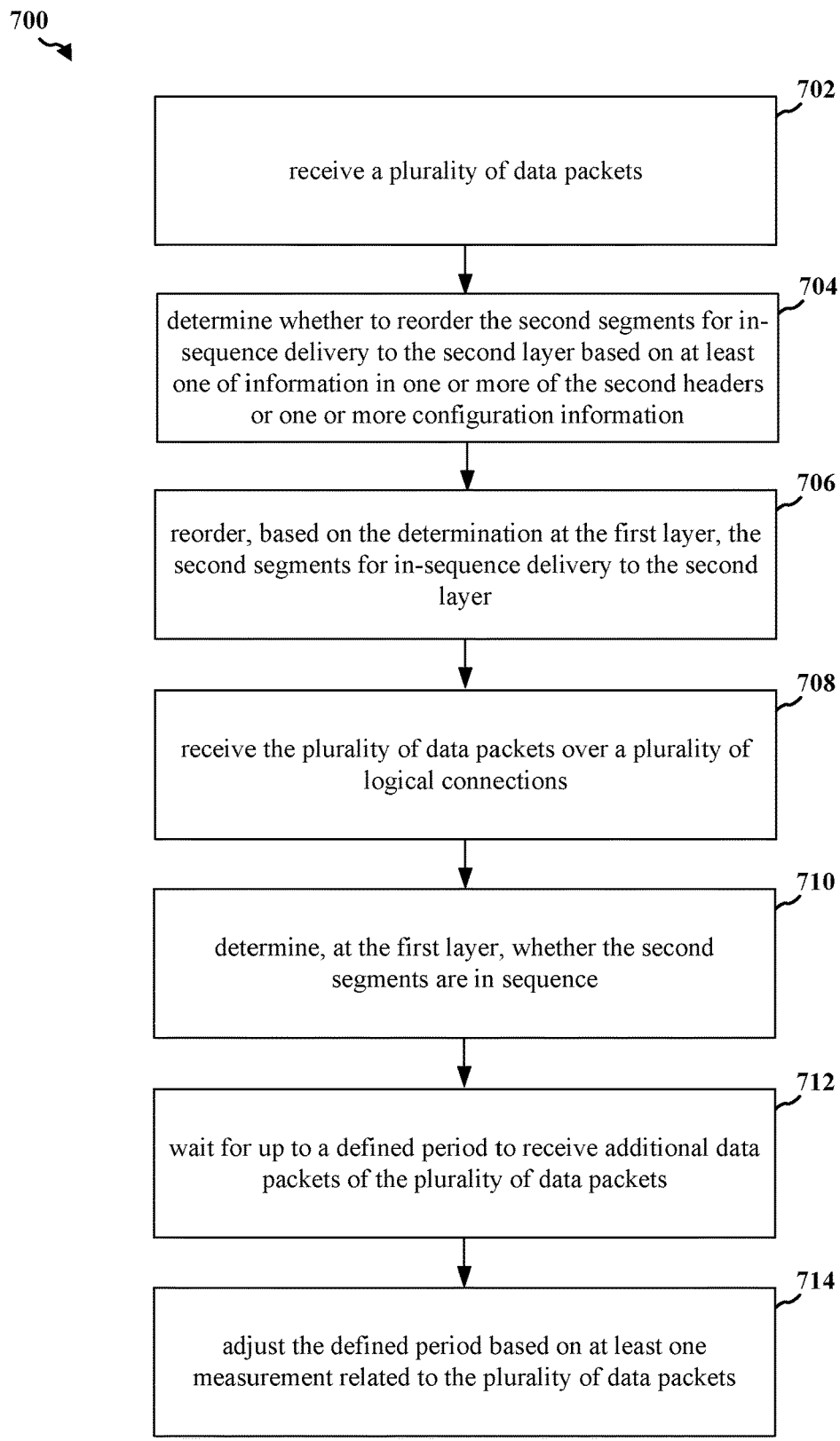
FIG. 7 is a flowchart of a method of wireless communication.

FIG. 7 is a flowchart of a method of wireless communication 700 by a node (104, 106, 310, 350, 410, 430, 530, 519, 521, 600) configured to support a protocol stack (200) may include a first layer (e.g., RLC) and a second layer (e.g., PDCP). In block 702, receive a plurality of data packets. For example, a node (104, 106, 310, 350, 410, 430, 530, 519, 521, 600) may receive a plurality of data packets in a transport block 442. Each of the data packets include a first segment for processing at the first layer (e.g., RLC). Each of the first segments include a first header and a first payload. Each of the first payloads include a second segment (444) having a second header and a second payload.

In block 704, determine, at the first layer, whether to reorder the second segments for in-sequence delivery to the second layer based on at least one of information in one or more of the second headers or one or more configuration information from the processing system. For example, a node (104, 106, 310, 350, 410, 430, 530, 519, 521, 600) may determine whether to reorder the second segments (444) for in-sequence delivery from the first layer (e.g., RLC) to the second layer (e.g., PDCP) based on information in one or more of the second headers.

In an aspect, the information in the one or more of the configuration information from the processing systems includes a flag that indicates whether to reorder the second segments at the first layer for in-sequence delivery to the second layer.

In block 706, reorder, based on the determination at the first layer, the second segments for in-sequence delivery to the second layer. For example, a node (104, 106, 310, 350, 410, 430, 530, 519, 521, 600) may reorder, based on the determination at the first layer (e.g., RLC), the second segments (444) for in-sequence delivery to the second layer (e.g., PDCP).

In block 708, receive the plurality of data packets over a plurality of logical connections. For example, a node (104, 106, 310, 350, 410, 430, 530, 519, 521, 600) may receive the plurality of data packets (e.g., in a RLC layer Protocol data unit (PDU) 440) over a plurality of logical connections.

In block 710, determine, at the first layer, whether the second segments are in sequence. For example, a node (104, 106, 310, 350, 410, 430, 530, 519, 521, 600) may determine, at the first layer (e.g., RLC), whether the second segments (444) are in sequence.

In block 712, wait for up to a defined period to receive additional data packets of the plurality of data packets. For example, a node (104, 106, 310, 350, 410, 430, 530, 519, 521, 600) may wait for up to a defined period to receive additional data packets of the plurality of data packets.

In block 714, adjust the defined period based on at least one measurement related to the plurality of data packets (e.g., within a RLC layer payload 442 within the RLC layer Protocol data unit (PDU) 440). For example, a node (104, 106, 310, 350, 410, 430, 530, 519, 521, 600) may adjust the defined period based on at least one measurement related to the plurality of data packets.

Figure 8:
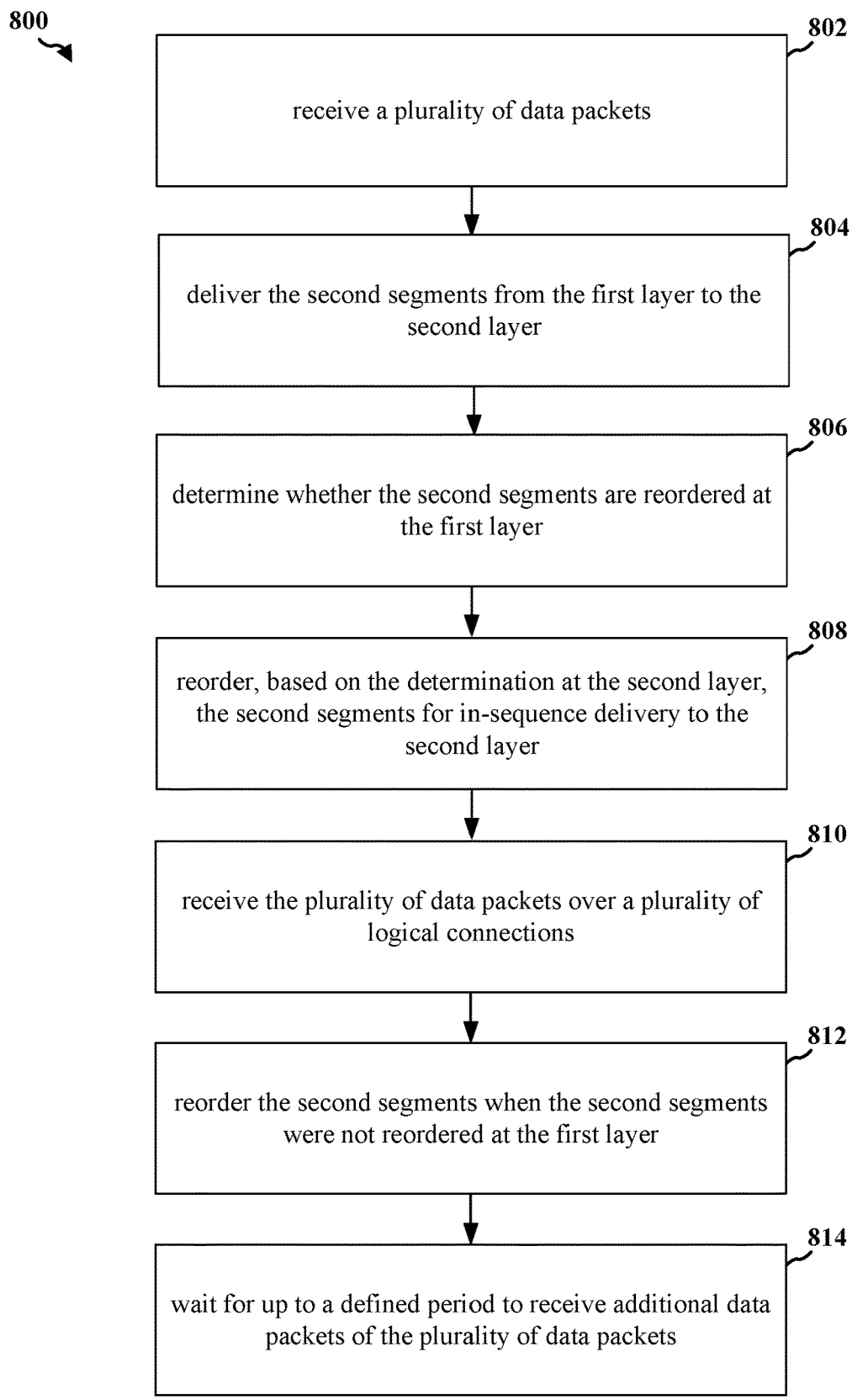
FIG. 8 is a flowchart of a method of wireless communication.

FIG. 8 is a flowchart of a method of wireless communication 800 by a node (104, 106, 310, 350, 410, 430, 530, 519, 521, 600) configured to support a protocol stack (200) may include a first layer (e.g., RLC) and a second layer (e.g., PDCP). In block 802, receive a plurality of data packets. For example, a node (104, 106, 310, 350, 410, 430, 530, 519, 521, 600) may receive a plurality of data packets. Each of the data packets may include a first segment for processing at the first layer (e.g., RLC). Each of the first segments include a first header and a first payload. Each of the first payloads include a second segment (444) having a second header and a second payload.

In block 804, deliver the second segments from the first layer to the second layer. For example, a node (104, 106, 310, 350, 410, 430, 530, 519, 521, 600) may deliver the second segments (444) from the first layer (e.g., RLC) to the second layer (e.g., PDCP).

In block 806, determine, at the second layer, whether the second segments were reordered at the first layer for in-sequence delivery to the second layer based on information in one or more of the second headers or based on one or more configuration information from the processing system or based on one or more configuration information from the first layer. For example, a node (104, 106, 310, 350, 410, 430, 530, 519, 521, 600) may determine, at the second layer, whether the second segments (444) were reordered at the first layer (e.g., RLC) for in-sequence delivery to the second layer (e.g., PDCP) based on information in one or more of the second headers or based on one or more configuration information from the processing system or based on one or more configuration information from the first layer.

In block 808, reorder, based on the determination at the second layer, the second segments for in-sequence delivery to the second layer. For example, a node (104, 106, 310, 350, 410, 430, 530, 519, 521, 600) may reorder, based on the determination at the second layer (e.g., PDCP), the second segments (444) for in-sequence delivery to the second layer (e.g., PDCP).

In block 810, receive the plurality of data packets over a plurality of logical connections. For example, a node (104, 106, 310, 350, 410, 430, 530, 519, 521, 600) may receive the plurality of data packets over a plurality of logical connections.

In block 812, reorder the second segments when the second segments were not reordered at the first layer. For example, a node (104, 106, 310, 350, 410, 430, 530, 519, 521, 600) may reorder the second segments (444) when the second segments (444) were not reordered at the first layer (e.g., RLC).

In block 814, wait for up to a defined period to receive additional data packets of the plurality of data packets. For example, a node (104, 106, 310, 350, 410, 430, 530, 519, 521, 600) may wait for up to a defined period to receive additional data packets of the plurality of data packets.

Figure 9:
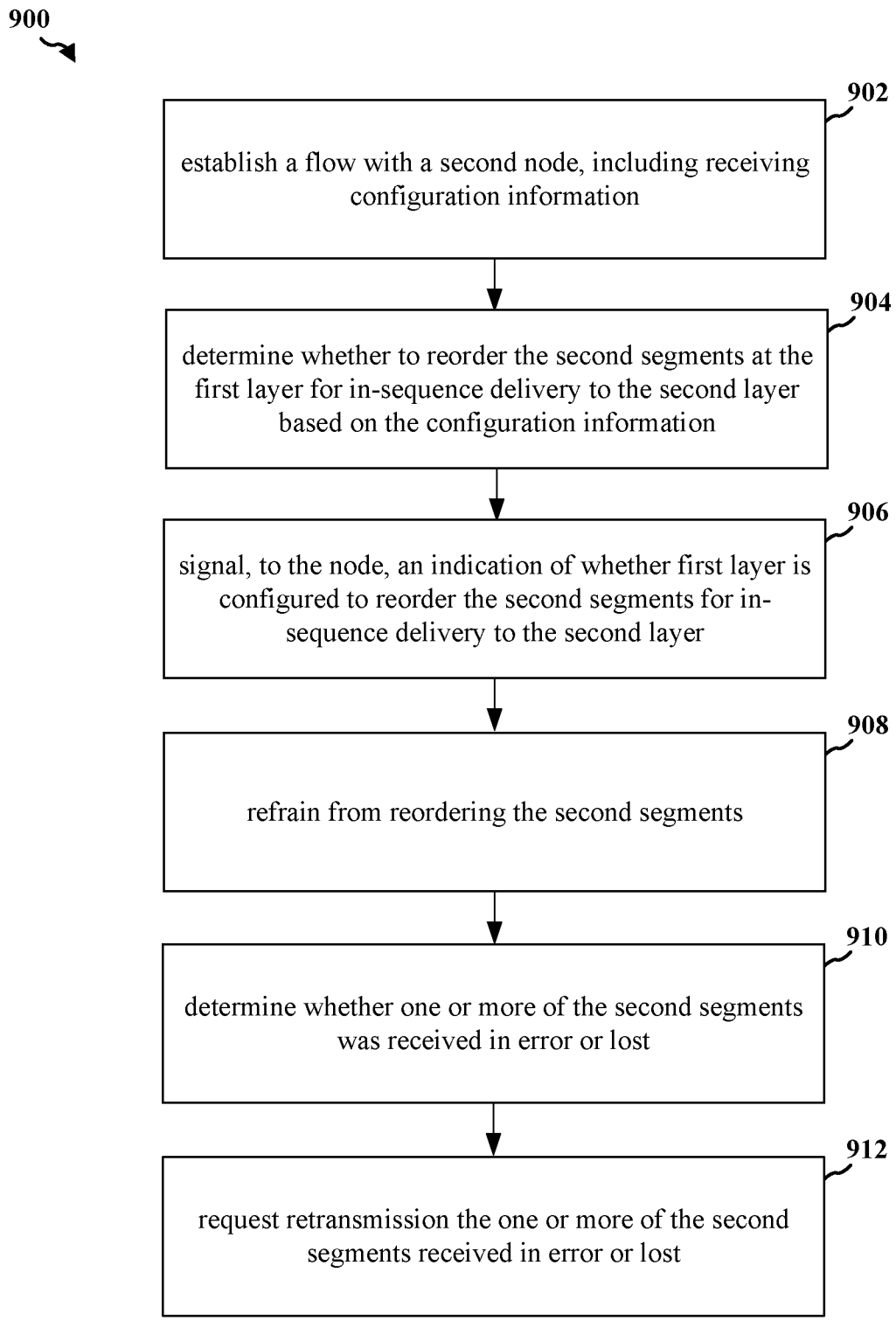
FIG. 9 is a flowchart of a method of wireless communication.

FIG. 9 is a flowchart of a method of wireless communication 900 by a first node (104, 106, 310, 350, 410, 430, 530, 519, 521, 600) configured to support a protocol stack (200) may include a first layer (e.g., RLC) and a second layer (e.g., PDCP). In block 902, establish a flow with a second node, including receiving configuration information. For example, a node (104, 106, 310, 350, 410, 430, 530, 519, 521, 600) may establish a flow with a second node (104, 106, 310, 350, 410, 430, 530, 519, 521, 600), including receiving configuration information. The flow may be associated with a plurality of data packets. Each of the data packets may include a first segment for processing at the first layer (e.g., RLC). Each of the first segments may include a first header and a first payload. Each of the first payloads may include a second segment (444) having a second header and a second payload.

In block 904, determine whether to reorder the second segments at the first layer for in-sequence delivery to the second layer based on the configuration information. For example, a node (104, 106, 310, 350, 410, 430, 530, 519, 521, 600) may determine whether to reorder the second segments (444) at the first layer (e.g., RLC) for in-sequence delivery to the second layer (e.g., PDCP) based on the configuration information.

In block 906, signal, to the node, an indication of whether first layer is configured to reorder the second segments for in-sequence delivery to the second layer. For example, a node (104, 106, 310, 350, 410, 430, 530, 519, 521, 600) may signal, to the node (104, 106, 310, 350, 410, 430, 530, 519, 521, 600), an indication of whether first layer (e.g., RLC) is configured to reorder the second segments (444) for in-sequence delivery to the second layer (e.g., PDCP).

In block 908, refrain from reordering the second segments. For example, a node (104, 106, 310, 350, 410, 430, 530, 519, 521, 600) may refrain from reordering the second segments (444).

In block 910, determine whether one or more of the second segments was received in error or lost, e.g., at the first layer. For example, a node (104, 106, 310, 350, 410, 430, 530, 519, 521, 600) may determine whether one or more of the second segments was received in error or lost, e.g., at the first layer.

In block 912, request retransmission of the one or more of the first segments received in error or lost at the first layer, e.g., at the first layer. For example, a node (104, 106, 310, 350, 410, 430, 530, 519, 521, 600) may request retransmission of the one or more of the first segments (444) received in error or lost, e.g., at the first layer.

Figure 10:
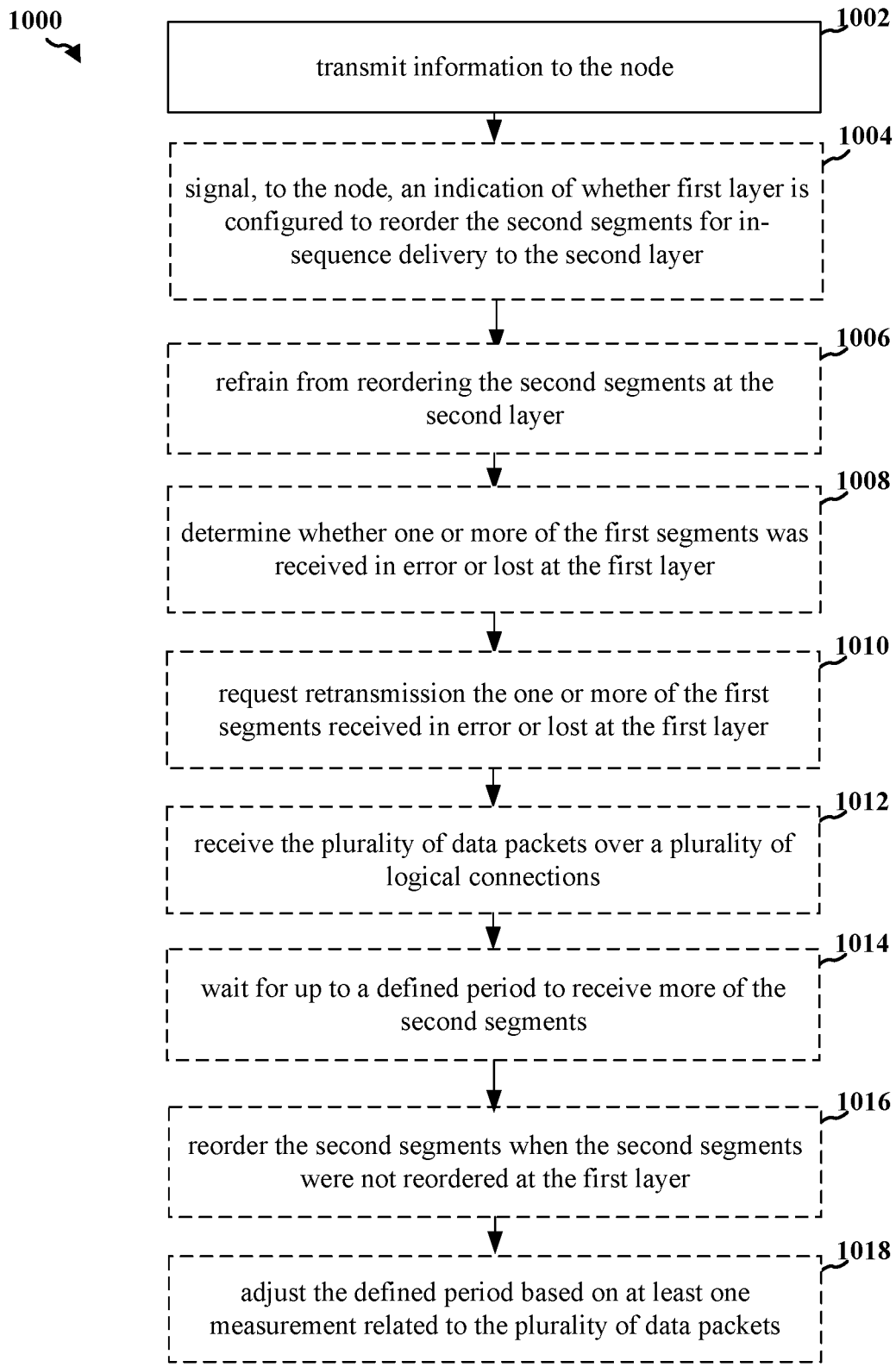
FIG. 10 is a flowchart of a method of wireless communication.

FIG. 10 is a flowchart of a method of wireless communication 1000. The method establishes a flow with a node (104, 106, 310, 350, 410, 430, 530, 519, 521, 600) supporting a protocol stack (200) having a first layer (e.g., RLC) and a second layer. In block 1002, transmit information to the node indicating whether to reorder the second segments at the first layer of the processing system (UE) for in-sequence delivery to the second layer and indicating whether to reorder the second segments at the first layer of the node (eNB) for in-sequence delivery to the second layer. For example, a wireless device (104, 106, 310, 350, 410, 430, 530, 519, 521, 600) may transmit information to the node (104, 106, 310, 350, 410, 430, 530, 519, 521, 600). The flow may be associated with a plurality of data packets. Each of the data packets may include a first segment for processing at the first layer (e.g., RLC). Each of the first segments may include a first header and a first payload. Each of the first payloads may include a second segment (444) having a second header and a second payload. The configuration information may indicate whether to reorder the second segments (444) at the first layer (e.g., RLC) for in-sequence delivery to the second layer (e.g., PDCP).

In block 1004, signal, to the node, an indication of whether first layer is configured to reorder the second segments for in-sequence delivery to the second layer. For example, the wireless device (104, 106, 310, 350, 410, 430, 530, 519, 521, 600) may signal, to the node (104, 106, 310, 350, 410, 430, 530, 519, 521, 600), an indication of whether first layer (e.g., RLC) is configured to reorder the second segments (444) for in-sequence delivery to the second layer (e.g., PDCP).

In block 1006, refrain from reordering the second segments at the second layer. For example, the wireless device (104, 106, 310, 350, 410, 430, 530, 519, 521, 600) may refrain from reordering the second segments (444) at the second layer.

In block 1008, determine whether one or more of the first segments was received in error or lost at the first layer. For example, the wireless device (104, 106, 310, 350, 410, 430, 530, 519, 521, 600) may determine whether one or more of the first segments (444) was received in error or lost at the first layer.

In block 1010, request retransmission of the one or more of the first segments (444) received in error or lost at the first layer. For example, the wireless device (104, 106, 310, 350, 410, 430, 530, 519, 521, 600) may request retransmission of the one or more of the first segments (444) received in error or lost at the first layer.

In block 1012, receive the plurality of data packets over a plurality of logical connections. For example, the wireless device (104, 106, 310, 350, 410, 430, 530, 519, 521, 600) may receive the plurality of data packets over a plurality of logical connections.

In block 1014, wait for up to a defined period to receive more of the second segments. For example, the wireless device (104, 106, 310, 350, 410, 430, 530, 519, 521, 600) may wait for up to a defined period to receive more of the second segments (444).

In block 1016, reorder the second segments when the second segments were not reordered at the first layer. For example, wireless device (104, 106, 310, 350, 410, 430, 530, 519, 521, 600) may reorder the second segments (444) when the second segments (444) were not reordered at the first layer (e.g., RLC).

In block 1018, adjust the defined period based on at least one measurement related to the plurality of data packets. For example, wireless device (104, 106, 310, 350, 410, 430, 530, 519, 521, 600) may adjust the defined period based on at least one measurement related to the plurality of data packets.

Figure 11:
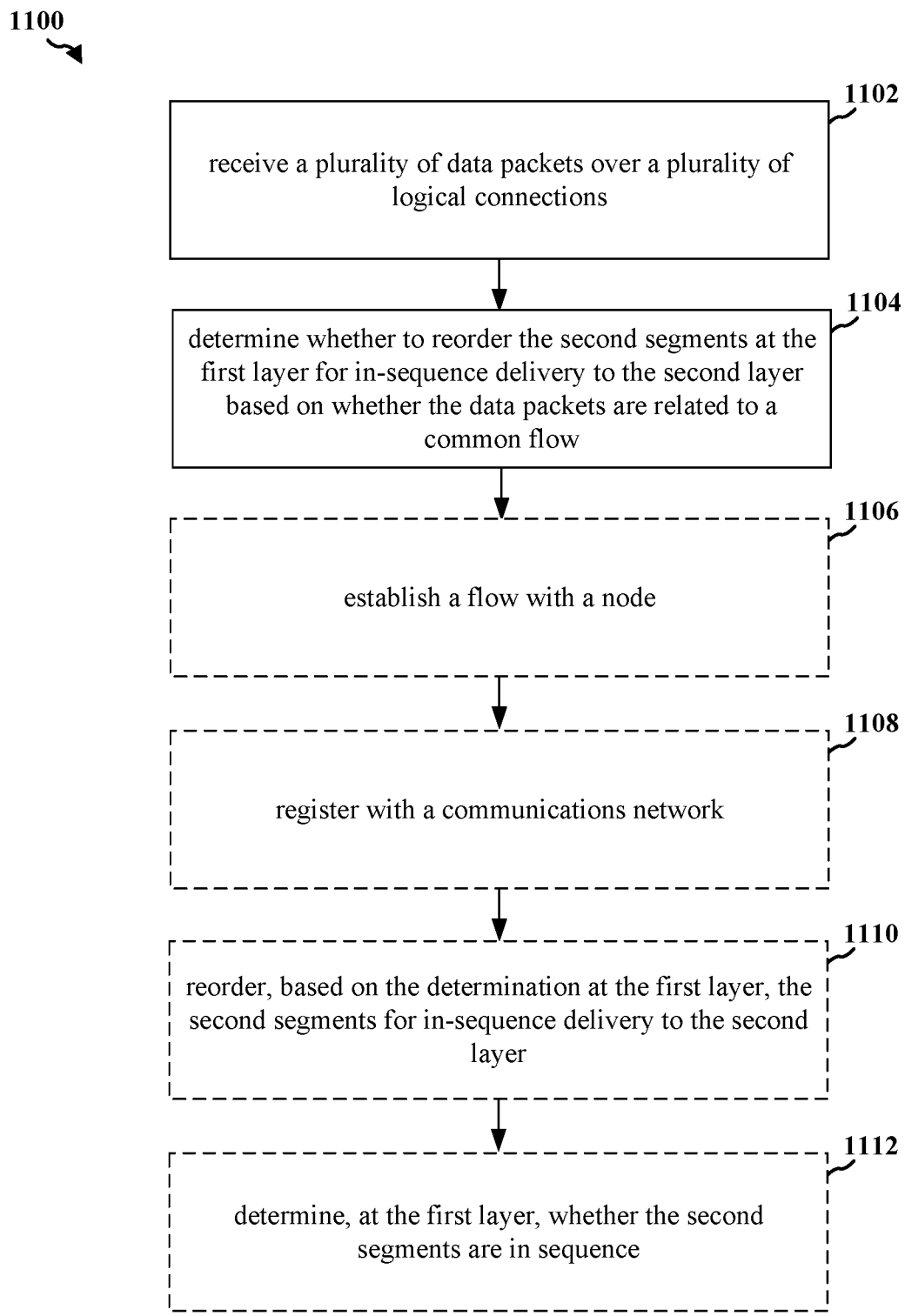
FIG. 11 is a flowchart of a method of wireless communication.

FIG. 11 is a flowchart of a method of wireless communication 1100 by a node (104, 106, 310, 350, 410, 430, 530, 519, 521, 600) configured to support a protocol stack (200) may include a first layer (e.g., RLC) and a second layer (e.g., PDCP). In block 1102, receive a plurality of data packets over a plurality of logical connections. For example, a node (104, 106, 310, 350, 410, 430, 530, 519, 521, 600) may receive a plurality of data packets over a plurality of logical connections. Each of the data packets may include a first segment for processing at the first layer (e.g., RLC). Each of the first segments may include a first header and a first payload. Each of the first payloads may include a second segment (444) having a second header and a second payload, In block 1104, determine whether to reorder the second segments at the first layer for in-sequence delivery to the second layer based on whether the data packets are related to a common flow. For example, a node (104, 106, 310, 350, 410, 430, 530, 519, 521, 600) may determine whether to reorder the second segments (444) at the first layer (e.g., RLC) for in-sequence delivery to the second layer (e.g., PDCP) based on whether the data packets are related to a common flow.

In block 1106, establish a flow with a node, wherein the processing system determines whether to reorder the second segments at the first layer during the establishment of the flow. For example, a node (104, 106, 310, 350, 410, 430, 530, 519, 521, 600) may establish a flow with a node (104, 106, 310, 350, 410, 430, 530, 519, 521, 600), wherein the processing system determines whether to reorder the second segments (444) at the first layer (e.g., RLC) during the establishment of the flow.

In block 1108, register with a communications network, including sending an indication of whether the processing system is configured to reorder the second segments at the first layer for in-sequence delivery to the second layer, wherein the communications network sends the indication to a node when establishing a flow with the node. For example, a node (104, 106, 310, 350, 410, 430, 530, 519, 521, 600) may register with a communications network, including sending an indication of whether the processing system is configured to reorder the second segments (444) at the first layer (e.g., RLC) for in-sequence delivery to the second layer (e.g., PDCP), wherein the communications network sends the indication to a node (104, 106, 310, 350, 410, 430, 530, 519, 521, 600) when establishing a flow with the node (104, 106, 310, 350, 410, 430, 530, 519, 521, 600).

In block 1110, reorder, based on the determination at the first layer, the second segments for in-sequence delivery to the second layer. For example, a node (104, 106, 310, 350, 410, 430, 530, 519, 521, 600) may reorder, based on the determination at the first layer (e.g., RLC), the second segments (444) for in-sequence delivery to the second layer (e.g., PDCP).

In block 1112, determine, at the first layer, whether the second segments are in sequence. For example, a node (104, 106, 310, 350, 410, 430, 530, 519, 521, 600) may determine, at the first layer (e.g., RLC), whether the second segments (444) are in sequence.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for communications, comprising:
  a processing system configured to support a protocol stack comprising a first layer and a second layer, the processing system being further configured to:
    receive a plurality of data packets over a plurality of connections with at least one other apparatus, each of the data packets comprising a first segment for processing at the first layer, each of the first segments comprising a first header and a first payload, and each of the first payloads comprising a second segment having a second header and a second payload;
    determine, at the first layer, when the second segments are out of sequence or are in sequence, whether to reorder the second segments for in-sequence delivery to the second layer or to refrain from reordering the second segments and deliver the second segments out of sequence to the second layer, the determination based on at least one of information in one or more of the second headers or one or more configuration information from the processing system;
    wait for up to a defined period to receive additional data packets of the plurality of data packets, wherein the defined period is based on at least one measurement related to a number of non-sequential transport blocks included in the plurality of data packets; and
    reorder, based on the determination at the first layer, the second segments at the first layer or at the second layer.

2. The apparatus of claim 1, wherein the information in the one or more of the second headers includes a flag that indicates whether to reorder the second segments at the first layer for in-sequence delivery to the second layer.

3. The apparatus of claim 1, wherein the one or more configuration information from the processing systems includes a flag that indicates whether to reorder the second segments at the first layer for in-sequence delivery to the second layer.

4. The apparatus of claim 1, wherein each of a plurality of logical connections is associated with a quality-of-service (QoS) class indicator (QCI) that indicates whether to reorder the second segments at the first layer.

5. The apparatus of claim 1, wherein the processing system is further configured to:
  adjust the defined period based on at least one measurement related to the plurality of data packets.

6. The apparatus of claim 1, wherein the information in the one or more of the second headers or in the one or more configuration information indicates to the first layer to:
  refrain from reordering the second segments;
  determine whether one or more of the first segments were received in error or lost; and
  request retransmission of the one or more of the first segments received in error or lost.

7. An apparatus for communications, comprising:
  a processing system configured to support a protocol stack comprising a first layer and a second layer, the processing system being further configured to:
    receive a plurality of data packets over a plurality of connections with at least one other apparatus, each of the data packets comprising a first segment for processing at the first layer, each of the first segments comprising a first header and a first payload, and each of the first payloads comprising a second segment having a second header and a second payload;
    deliver the second segments to the second layer;
    determine, at the second layer, whether second segments were reordered at the first layer for in-sequence delivery to the second layer or were delivered to the second layer out of sequence, the determination based on information in one or more of the second headers or based on one or more configuration information from the processing system or based on one or more configuration information from the first layer;
    wait for up to a defined period to receive additional data packets of the plurality of data packets, wherein the defined period is based on at least one measurement related to a number of non-sequential transport blocks included in the plurality of data packets; and
    reorder, based on the determination at the second layer, the second segments at the second layer when out of order second segments were not reordered at the first layer.

8. The apparatus of claim 7, wherein the information in the one or more of the second headers includes a flag that indicates whether the second segments were reordered at the first layer.

9. An apparatus for communications, comprising:
  a processing system configured to support a protocol stack comprising a first layer and a second layer, the processing system being further configured to:
    establish a data flow with a node, the establishment including receiving configuration information, wherein the data flow is associated with a plurality of connections with at least one other apparatus over which a plurality of data packets is received, each of the data packets comprising a first segment for processing at the first layer, each of the first segments comprising a first header and a first payload, and each of the first payloads comprising a second segment having a second header and a second payload;
    determine, at the first layer, whether the second segments are in sequence or out of sequence and, when the second segments are out of sequence, whether to reorder the second segments at the first layer for in-sequence delivery to the second layer or to refrain from reordering the second segments and deliver the second segments out of sequence to the second layer, the determination based on the configuration information;

wait for up to a defined period to receive additional data packets of the plurality of data packets, wherein the defined period is based on at least one measurement related to a number of non-sequential transport blocks included in the plurality of data packets; and reorder, based on the determination at the first layer, the second segments at the first layer or at the second layer.

10. The apparatus of claim 9, wherein the configuration information indicates the second layer does not require the first layer to perform reordering of the second segments.

11. The apparatus of claim 10, wherein the configuration information indicates that the second layer is configured to reorder the second segments.

12. The apparatus of claim 9, wherein the processing system is further configured to:
signal, to the node, an indication of whether the first layer is configured to reorder the second segments for in-sequence delivery to the second layer.

13. The apparatus of claim 9, wherein the configuration information indicates whether the processing system is configured to:
refrain from reordering the second segments at the second layer;
determine whether one or more of the first segments was received in error or lost at the first layer; and
request retransmission of the one or more of the first segments received in error or lost at the first layer.

14. The apparatus of claim 9, wherein the processing system is further configured to:
adjust the defined period based on at least one measurement related to the plurality of data packets.

15. An apparatus for communications, comprising:
a processing system configured to establish a data flow with a node supporting a protocol stack having a first layer and a second layer, wherein:
the data flow is associated with a plurality of connections with at least one other apparatus over which a plurality of data packets is communicated, each of the data packets comprising a first segment for processing at the first layer, each of the first segments comprising a first header and a first payload, and each of the first payloads comprising a second segment having a second header and a second payload, and
the establishment of the data flow comprises to:
determine when reordering should occur; and
transmit information to the node indicating whether, when the second segments are out of order, to reorder the second segments at the first layer of the protocol stack for in-sequence delivery to the second layer after waiting for a defined period that is based on at least one measurement related to a number of non-sequential transport blocks included in the plurality of data packets to receive the plurality of data packets or whether to refrain from reordering the second segments at the first layer of the protocol stack and deliver the second segments out of sequence to the second layer for reordering at the second layer after waiting for the defined period to receive the plurality of data packets, and the reordering occurring based on a determination that the second segments are out of order.

16. The apparatus of claim 15, wherein the information indicates the second layer does not require the first layer to perform reordering of the second segments.

17. The apparatus of claim 16, wherein the information indicates that the second layer is capable of or configured to reorder the second segments.

18. The apparatus of claim 15, wherein the processing system is further configured to:
signal, to the node, an indication of whether the first layer is configured to reorder the second segments for in-sequence delivery to the second layer.

19. The apparatus of claim 18, wherein the indication contains information of whether the first layer is configured to reorder the second segments for in-sequence delivery to the second layer for each individual packet data flow, bearer, sub-bearer, or logic connections associated with a transmission of packets.

20. The apparatus of claim 15, wherein the information indicates whether the node is configured to:
refrain from reordering the second segments at the second layer;
determine whether one or more of the first segments was received in error or lost at the first layer; and
request retransmission of the one or more of the first segments received in error or lost at the first layer.

21. The apparatus of claim 15, wherein each of the plurality of logical connections are associated with a quality-of-service (QoS) class indicator (QCI) that indicates whether the second segments are reordered at the first layer.

22. An apparatus for communications, comprising:
a processing system configured to support a protocol stack comprising a first layer and a second layer, the processing system being further configured to:
receive a plurality of data packets over a plurality of logical connections with at least one other apparatus, each of the data packets comprising a first segment for processing at the first layer, each of the first segments comprising a first header and a first payload, and each of the first payloads comprising a second segment having a second header and a second payload;
determine, at the first layer, whether the second segments are in sequence or out of sequence and, when the second segments are out of sequence, whether to reorder the second segments for in-sequence delivery to the second layer or to refrain from reordering the second segments and deliver the second segments out of sequence to the second layer, the determination based on whether the data packets are related to a common flow;
wait for up to a defined period to receive additional data packets of the plurality of data packets, wherein the defined period is based on at least one measurement related to a number of non-sequential transport blocks included in the plurality of data packets; and
reorder, based on the determination at the first layer, the second segments at the first layer or at the second layer.

23. The apparatus of claim 22, wherein the processing system is further configured to:
establish a data flow with a node, wherein the processing system determines whether to reorder the second segments at the first layer during the establishment of the data flow.

24. The apparatus of claim 22, wherein the processing system is further configured to:
  register with a communications network, including sending an indication of whether the processing system is configured to reorder the second segments at the first layer for in-sequence delivery to the second layer, wherein the communications network sends the indication to a node when establishing a data flow with the node.

25. The apparatus of claim 22, wherein each of the plurality of logical connections are associated with a quality-of-service (QoS) class indicator (QCI) that indicates whether to reorder the second segments at the first layer.

26. The apparatus of claim 22, wherein the processing system is further configured to:
  adjust the defined period based on at least one measurement related to the plurality of data packets.

27. The apparatus of claim 22, wherein the information in the second headers indicates to the first layer to:
  refrain from reordering the second segments;
  determine whether one or more of the second segments was received in error or lost; and
  request retransmission of the one or more of the second segments received in error or lost.

28. The apparatus of claim 1, wherein each of the data packets of the plurality of data packets includes a common bearer identification (ID) in one of the first header or second header.

* * * * *